(12) United States Patent
Uemura

(10) Patent No.: US 11,336,778 B2
(45) Date of Patent: May 17, 2022

(54) IMAGE FORMING APPARATUS THAT PROVIDES NOTIFICATION WHEN COMMUNICATION WITH A PORTABLE TERMINAL IS ENABLED

(71) Applicant: Canon Kabushiki Kaisha, Tokyo (JP)

(72) Inventor: Takuya Uemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/091,342

(22) Filed: Nov. 6, 2020

(65) Prior Publication Data

US 2021/0144267 A1    May 13, 2021

(30) Foreign Application Priority Data

Nov. 8, 2019    (JP) ............................. JP2019203464

(51) Int. Cl.
*H04N 1/00*      (2006.01)
*H04W 4/80*      (2018.01)

(52) U.S. Cl.
CPC ..... *H04N 1/00307* (2013.01); *H04N 1/00214* (2013.01); *H04N 1/00342* (2013.01); *H04W 4/80* (2018.02); *H04N 2201/006* (2013.01)

(58) Field of Classification Search
None
See application file for complete search history.

(56) References Cited

U.S. PATENT DOCUMENTS

| 7,747,219 | B2* | 6/2010 | Shiohara | G06F 3/1205 |
| | | | | 455/41.2 |
| 10,614,270 | B2* | 4/2020 | Morimoto | H04W 36/0027 |
| 2015/0359021 | A1* | 12/2015 | Tsujii | H04W 4/80 |
| | | | | 455/41.1 |
| 2016/0381494 | A1* | 12/2016 | Hamada | H04W 76/15 |
| | | | | 370/315 |
| 2018/0124651 | A1* | 5/2018 | Takada | H04W 36/0016 |
| 2019/0196762 | A1* | 6/2019 | Ohhata | G06F 1/3231 |
| 2021/0127037 | A1* | 4/2021 | Akazawa | H04N 1/32101 |
| 2021/0160384 | A1* | 5/2021 | Suga | H04N 1/00342 |

FOREIGN PATENT DOCUMENTS

| JP | 2014120915 A | 6/2014 |
| JP | 2015231156 A | 12/2015 |
| JP | 2017050878 A | 3/2017 |
| JP | 2019057853 A | 4/2019 |

* cited by examiner

*Primary Examiner* — Henok Shiferaw
(74) *Attorney, Agent, or Firm* — Venable LLP

(57) ABSTRACT

An image forming apparatus includes an image forming portion, a first communication portion for communicating with a portable terminal through near field wireless communication by using a first communication type in response to holding of the portable terminal thereover, a second communication portion, capable of communicating with the portable terminal on the basis of communication with the portable terminal by using the first communication type, for carrying out wireless communication with the portable terminal by using a second communication type broader in communication range than the first communication type, and a sound generating portion for generating a notification sound for notifying that communication between the portable terminal and the second communication portion is enabled in response to enablement of the communication between the portable terminal and the second communication portion.

11 Claims, 19 Drawing Sheets

(a)

(b)

(c)

(d)

(a)

(b)

IMAGE FORMING APPARATUS THAT PROVIDES NOTIFICATION WHEN COMMUNICATION WITH A PORTABLE TERMINAL IS ENABLED

FIELD OF THE INVENTION AND RELATED ART

The present invention relates to an image forming apparatus such as a copying machine, a printer, a facsimile machine and a multi-function machine having a plurality of functions of these machines.

In recent years, as a communication standard for near field wireless communication, near field communication (hereinafter referred to as NFC) has been widely used. Further, products applying the NFC to pairing and user authentication in order to meet a communication standard capable of high-speed wireless communication compared with the NFC such as WiFi (registered trade name) appear. The pairing refers to communication procedure for sending and receiving apparatus information (connection information) in order to establish wireless communication between devices (apparatuses). A user causes NFC-enabled devices to be close to each other, whereby complicated connection setting for wireless communication compatible with a communication standard (for example, WiFi) different from the NFC can be automatically performed (JP-A 2015-231156). When such pairing between the devices is carried out by the NFC, subsequent communication is automatically succeeded from the NFC to the wireless communication such as the WiFi (so-called handover).

Recently, also in the image forming apparatus such as the copying machine or the printer, a technique for handover utilizing the NFC communication starts to be implemented. As an example, in the image forming apparatus, an NFC tag in which pieces of connection information, for WiFi communication, such as an SSID, an IP address and a MAC address are written in advance is provided. The user holds a portable terminal compatible with the NFC and the WiFi communication over a predetermined position of the image forming apparatus, whereby pairing between the portable terminal and the image forming apparatus is carried out. Then, establishment of WiFi connection between the portable terminal and the image forming apparatus is carried out through the NFC. In the case where the WiFi connection is established, the image forming apparatus receives image data from, for example, the portable terminal through the WiFi communication, and then is capable of performing an image forming operation for outputting an image on a recording material on the basis of the received image data.

Incidentally, in the case of the NFC, in order to prevent interruption of the communication, there is a need that the user maintains the portable terminal in a state in which the portable terminal is held over the image forming apparatus. However, conventionally, in the case where the WiFi connection is established by the NFC, the user cannot grasp establishment of the WiFi connection in the image forming apparatus, so that it was difficult to discriminate whether a current communication status is achieved by the NFC or the WiFi communication. Therefore, some user keeps the portable terminal held over the image forming apparatus, so that during a period thereof, the user does not readily operate the portable terminal.

SUMMARY OF THE INVENTION

According to an aspect of the present invention, there is provided an image forming apparatus comprising: an image forming portion configured to form an image on a sheet; a first communication portion configured to communicate with a portable terminal through near field wireless communication by using a first communication type in response to holding of the portable terminal thereover; a second communication portion capable of communicating with the portable terminal on the basis of communication with the portable terminal by using the first communication type and configured to carry out wireless communication with the portable terminal by using a second communication type broader in communication range than the first communication type; and a sound generating portion configured to generate a notification sound for notifying that communication between the portable terminal and the second communication portion is enabled in response to enablement of the communication between the portable terminal and the second communication portion.

According to another aspect of the present invention, there is provided an image forming apparatus comprising: an image forming portion configured to form an image on a sheet; a first communication portion configured to communicate with a portable terminal through near field wireless communication in accordance with a first communication type in response to holding of the portable terminal thereover; a second communication portion capable of communicating with the portable terminal on the basis of communication with the portable terminal by using the first communication type and configured to carry out wireless communication with the portable terminal by using a second communication type broader in communication range than the first communication type; and a light emitting portion configured to emit light for notifying that communication between the portable terminal and the second communication portion is enabled in response to enablement of the communication between the portable terminal and the second communication portion.

According to a further aspect of the present invention, there is provided an image forming apparatus comprising: an image forming portion configured to form an image on a sheet; a first communication portion configured to communicate with a portable terminal through near field wireless communication by using a first communication type in response to holding of the portable terminal thereover; a second communication portion capable of communicating with the portable terminal on the basis of communication with the portable terminal by using the first communication type and configured to carry out wireless communication with the portable terminal by using a second communication type broader in communication range than the first communication type; and a display portion capable of displaying information on image formation and configured to display that communication between the portable terminal and the second communication portion is enabled in response to enablement of the communication between the portable terminal and the second communication portion.

Further features of the present invention will become apparent from the following description of exemplary embodiments with reference to the attached drawings.

Figure 11:
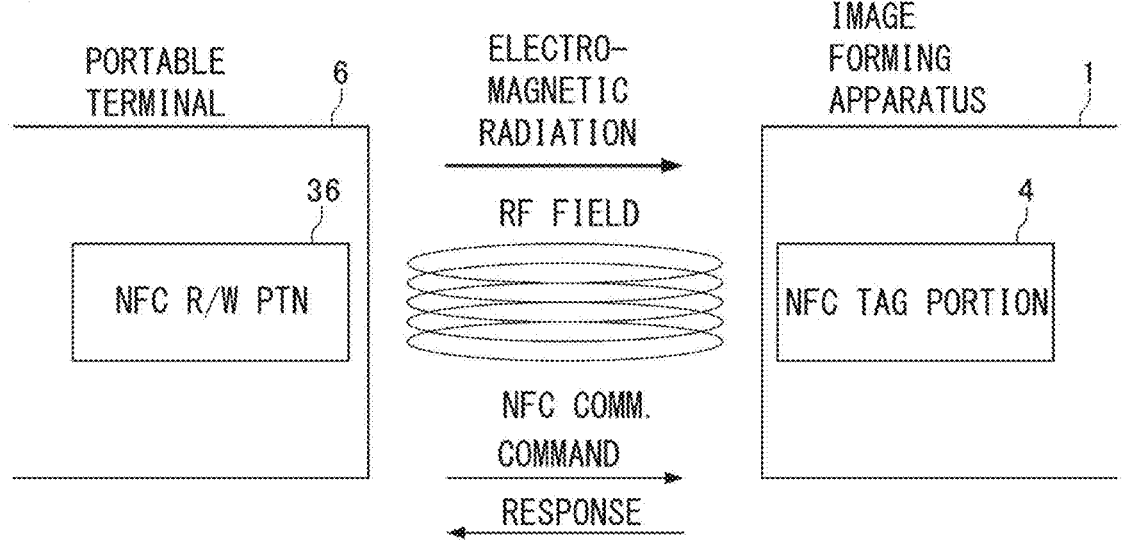
Figure 11:
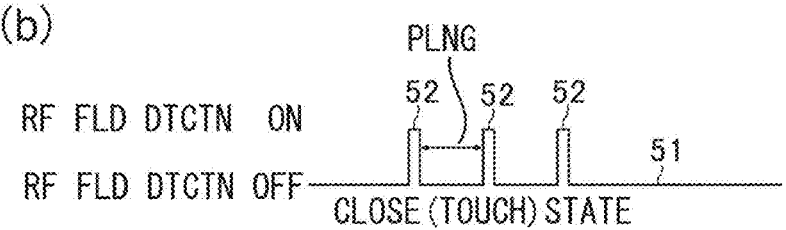
Figure 11:
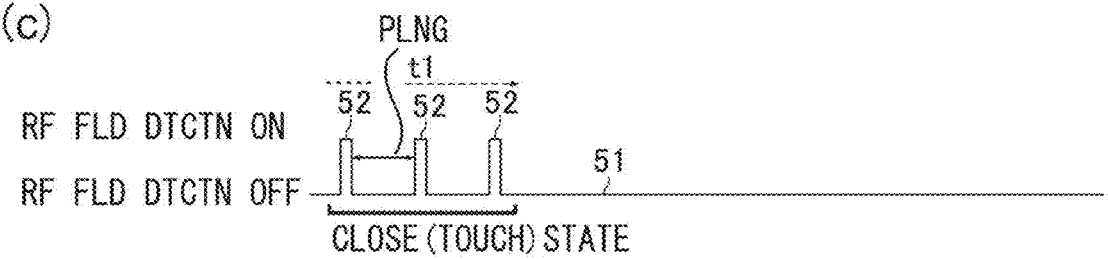
Figure 11:
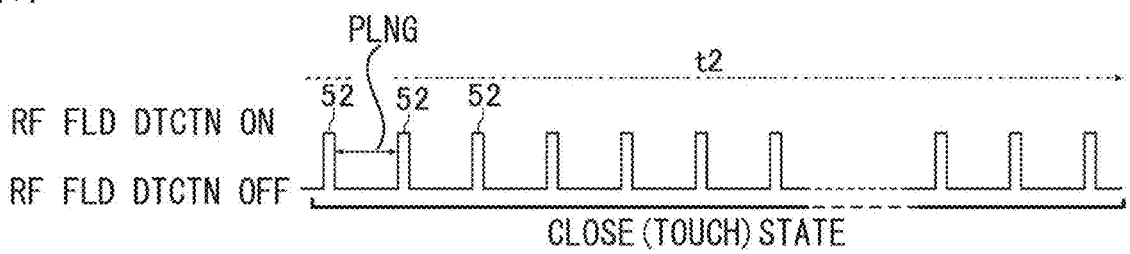

Part (a) of FIG. 11 is a schematic view for illustrating a summary of the NFC, part (b) of FIG. 11 is a schematic view showing an output of an RF field detecting portion, part (c) of FIG. 11 is a schematic view showing an output in the case where an NFC tag can be normally read, and part (d) of FIG. 11 is a schematic view showing an output in the case where the NFC tag cannot be normally read.

Figure 12:
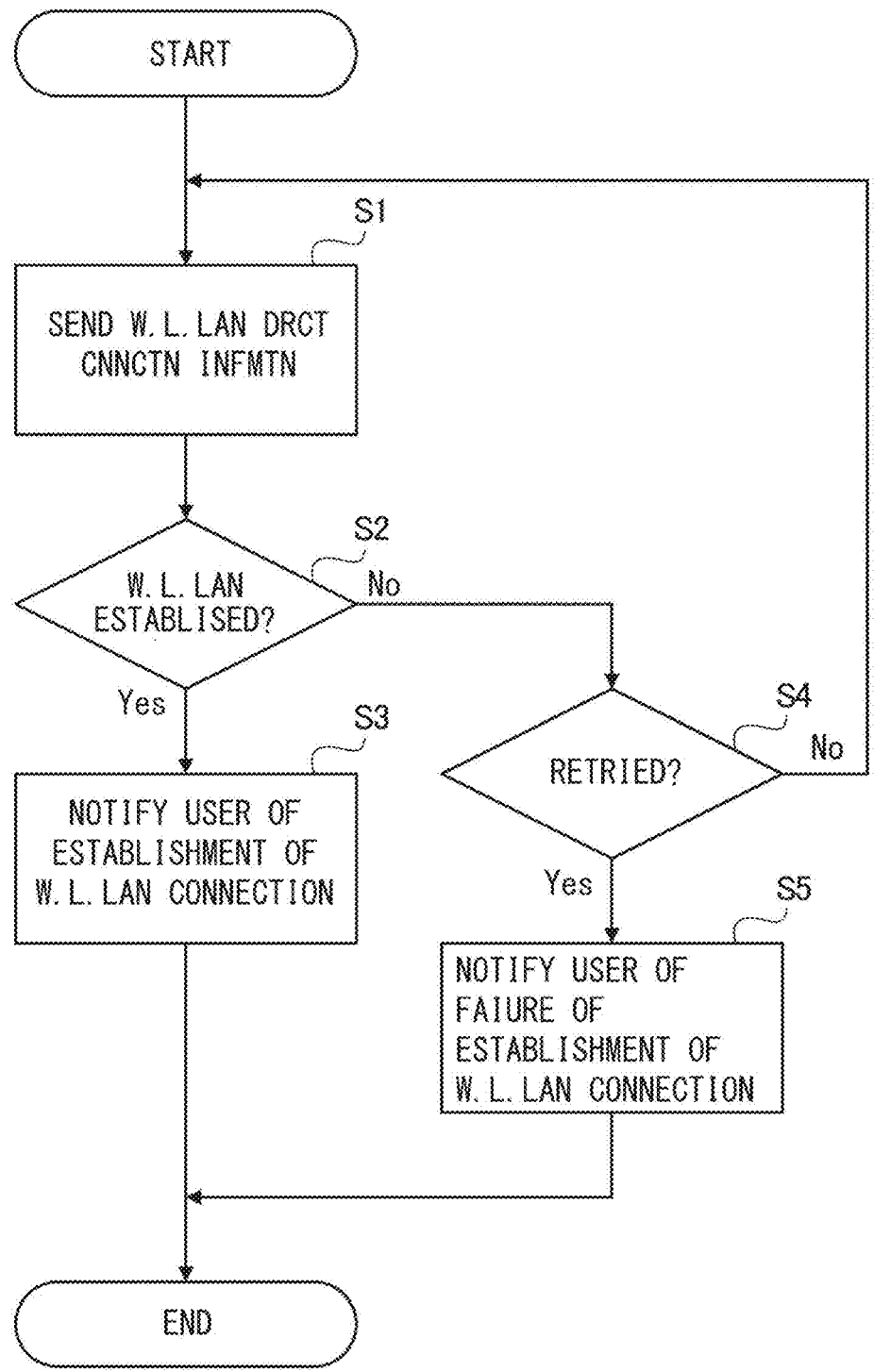

FIG. 12 is a flowchart showing a connection establishment process in this embodiment.

Figure 13:
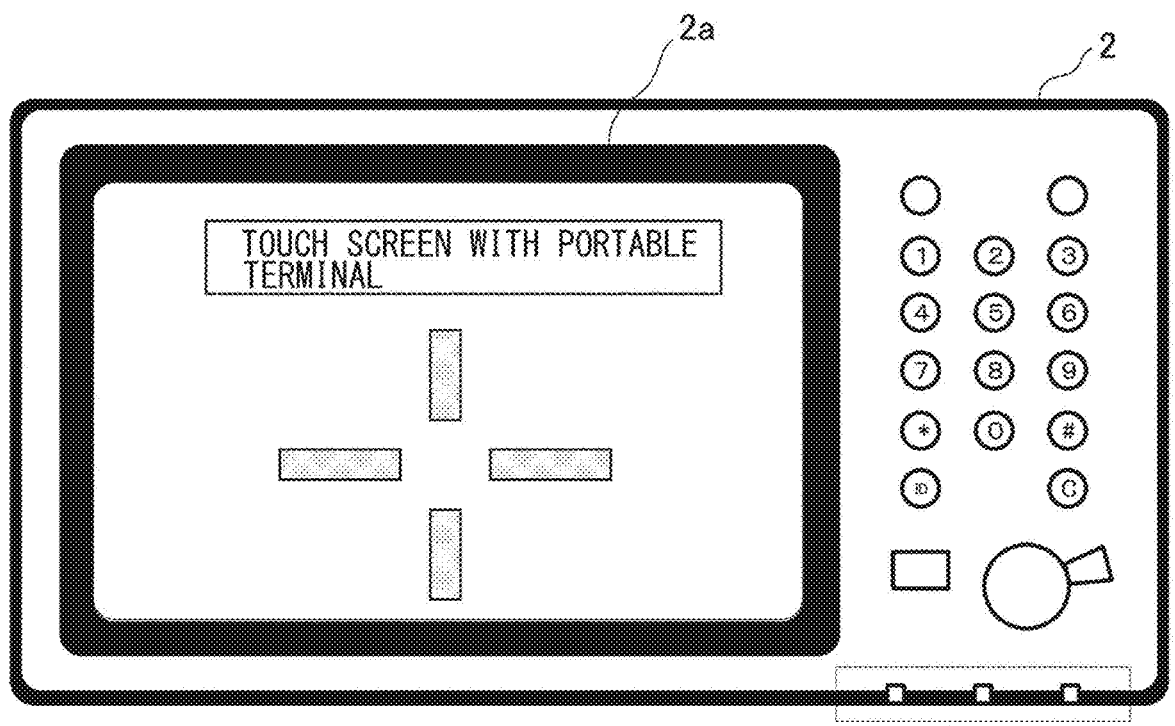

FIG. 13 is a schematic view showing a touch screen for causing a portable terminal to be close thereto.

Figure 14:
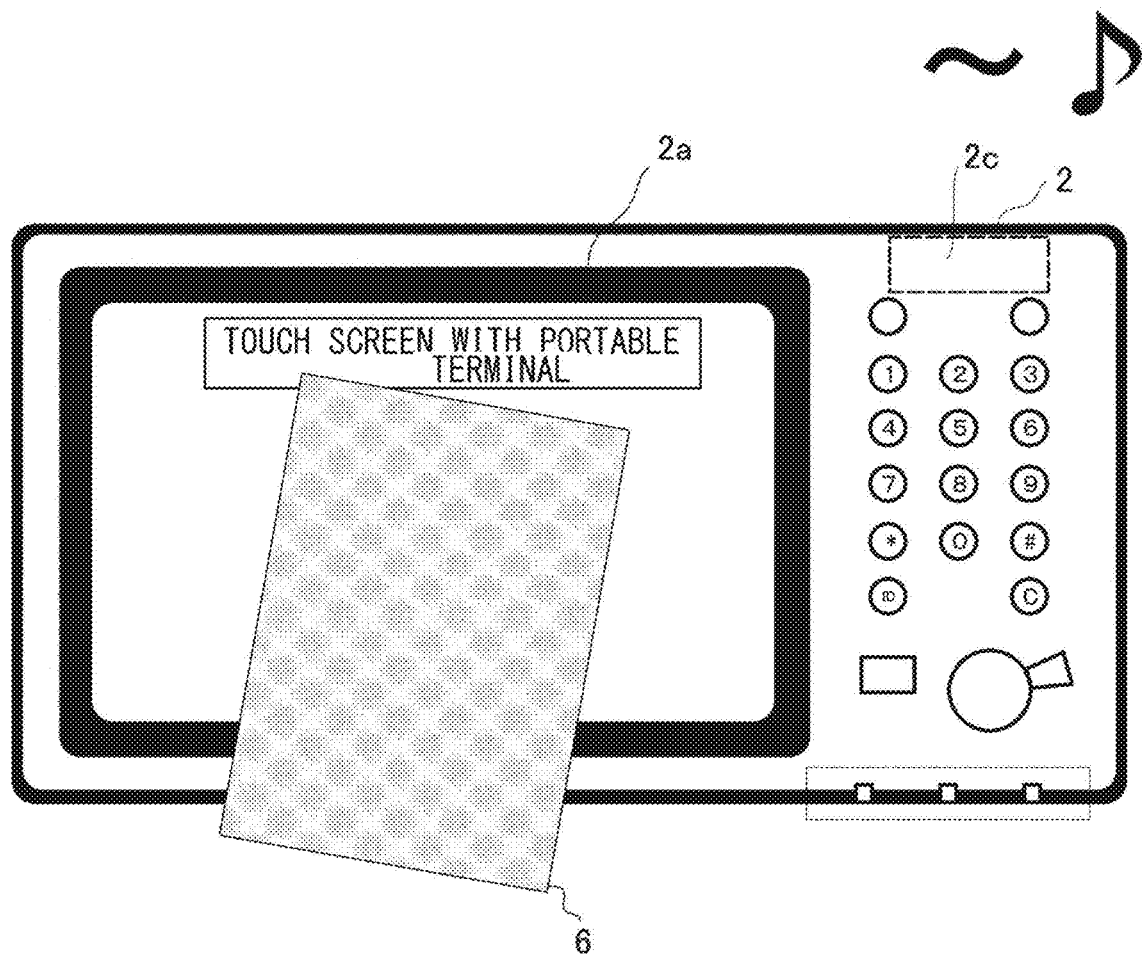

FIG. 14 is a schematic view showing an example of connection establishment notification of the portable terminal.

Figure 15:
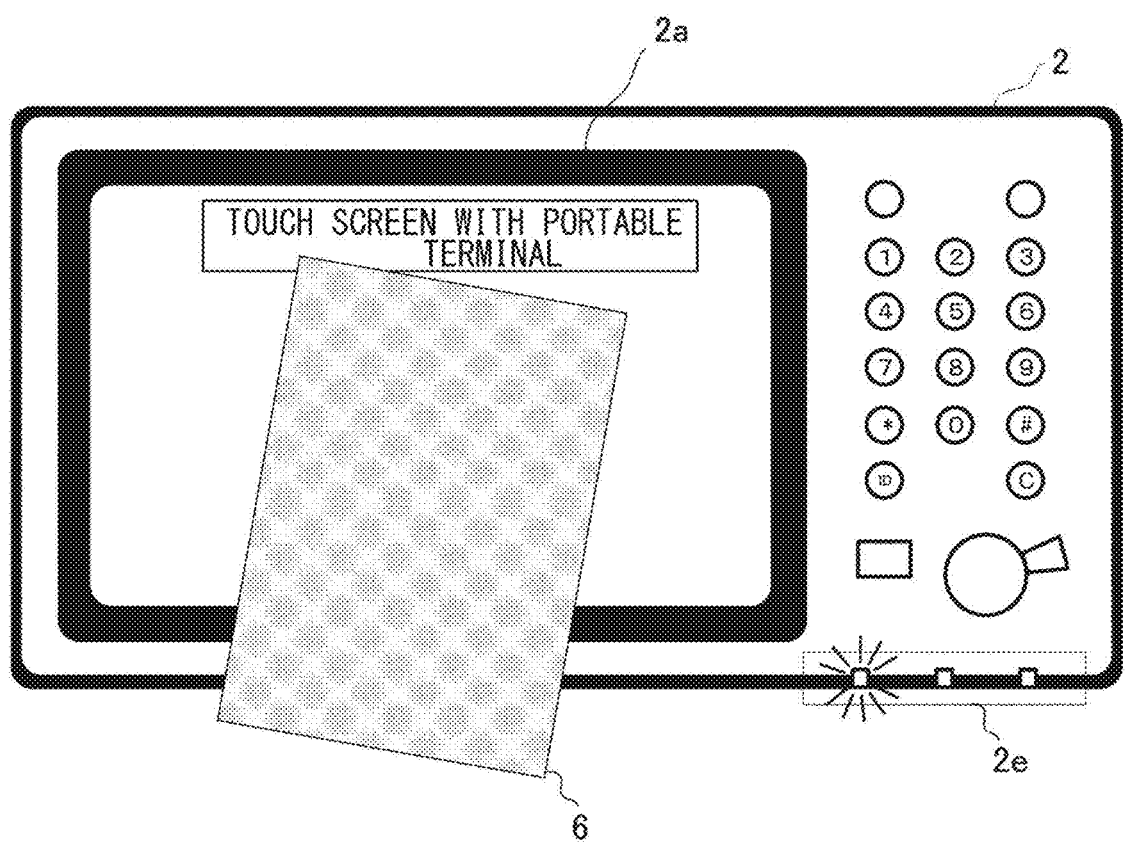

FIG. 15 is a schematic view showing another example of the connection establishment notification of the portable terminal.

Figure 16:
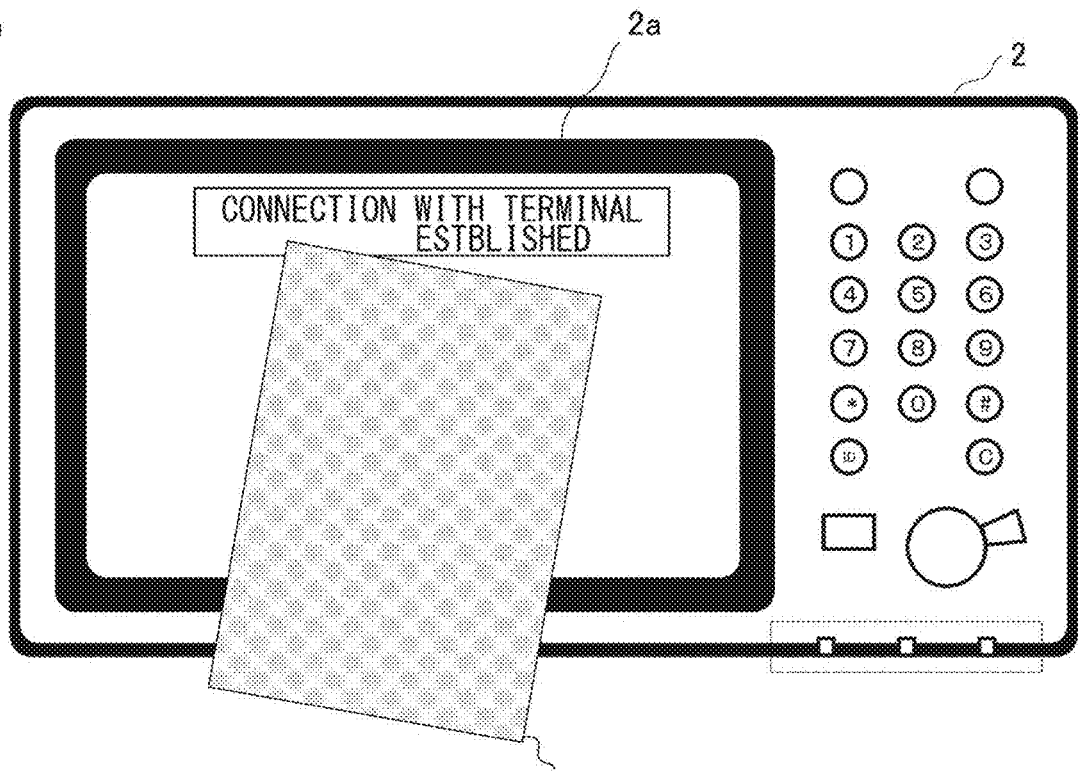
Figure 16:
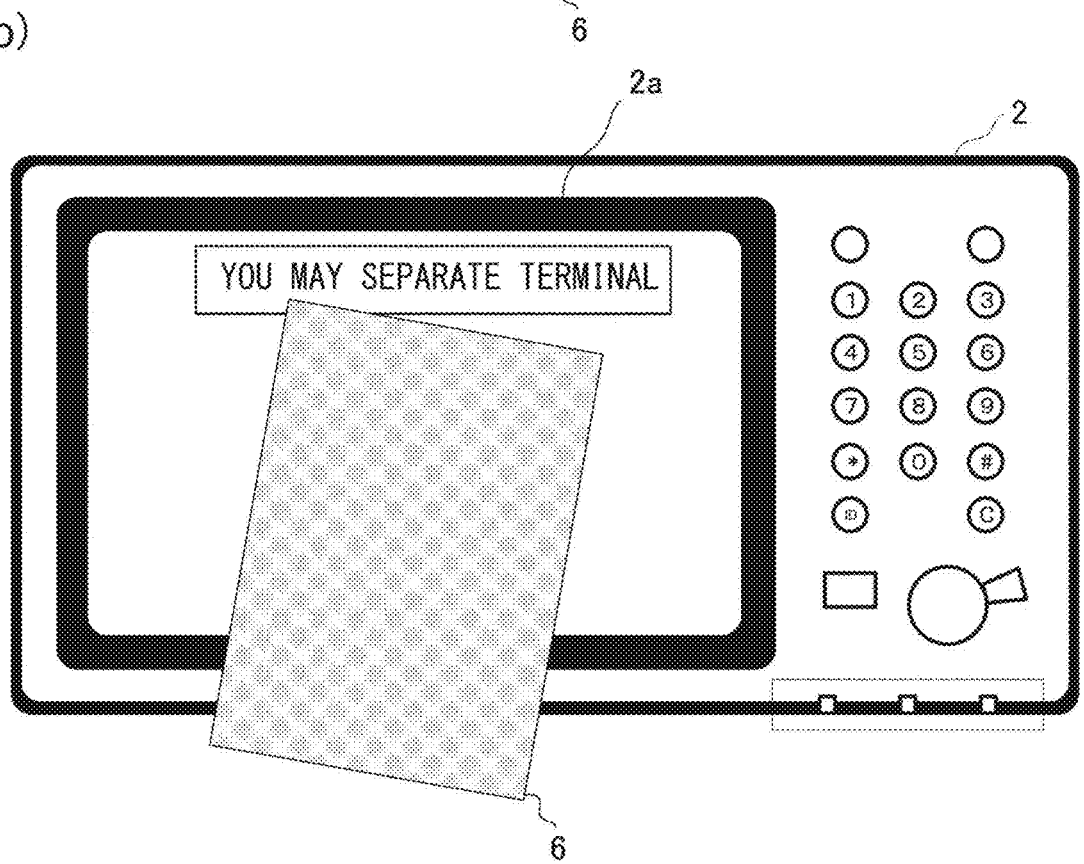

Part (a) of FIG. 16 is a schematic view showing a further example of the connection establishment notification, and part (b) of FIG. 16 is a schematic view showing a notification example in which a user may separate (remove) the portable terminal from the touch screen.

Figure 17:
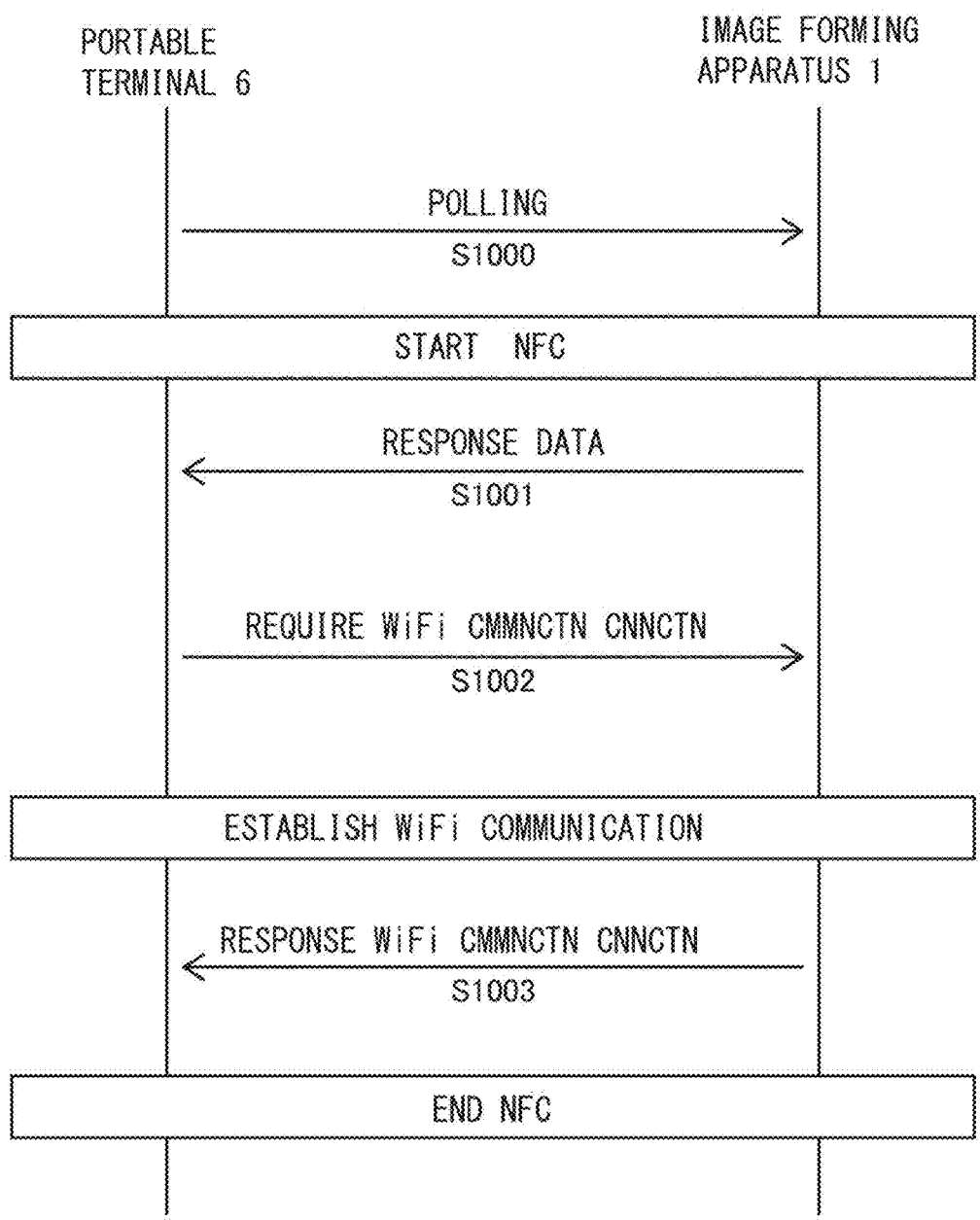

FIG. 17 is a schematic view showing a communication procedure of the NFC and WiFi communication between the image forming apparatus and the portable terminal.

Figure 18:
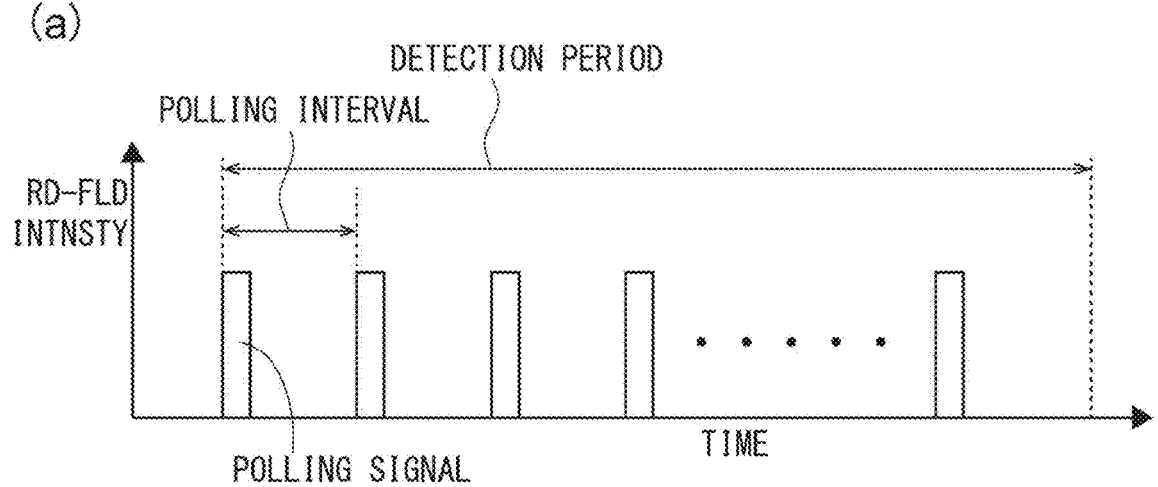
Figure 18:
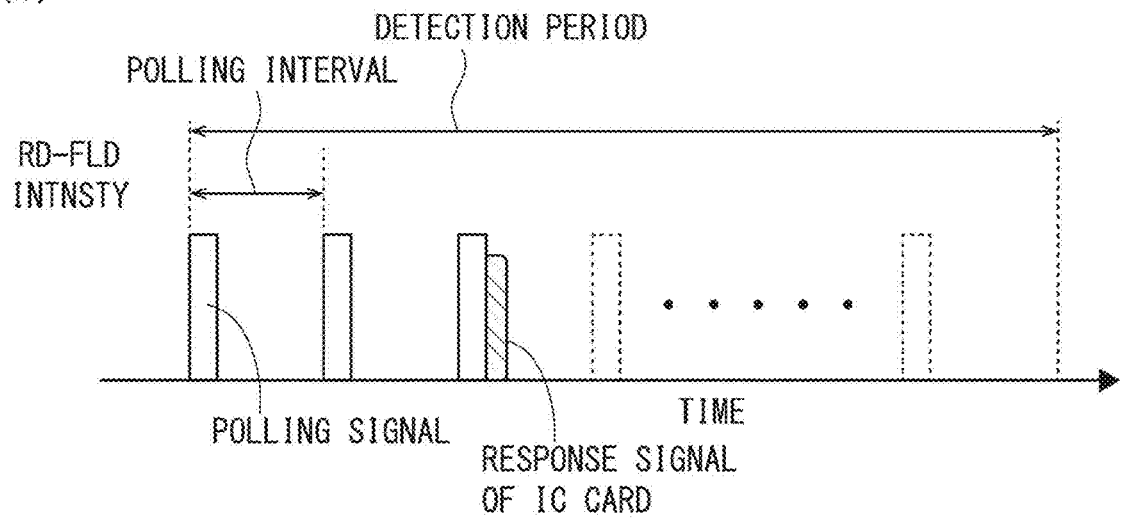
Figure 18:
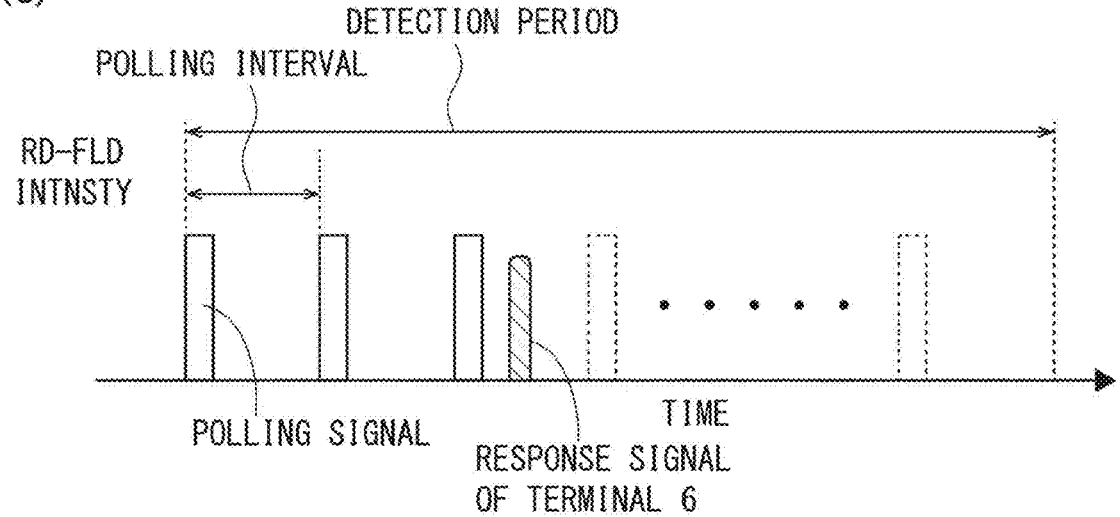

Parts (a) to (c) of FIG. 18 are schematic views for illustrating a polling operation, in which part (a) is the schematic view showing an output of the RF field detecting portion, part (b) is the schematic view showing an output in the case where an ID card is caused to be close to an NFC tag portion, and part (c) is the schematic view showing an output in the case where the portable terminal is caused to be close to the NFC tag portion.

Figure 19:
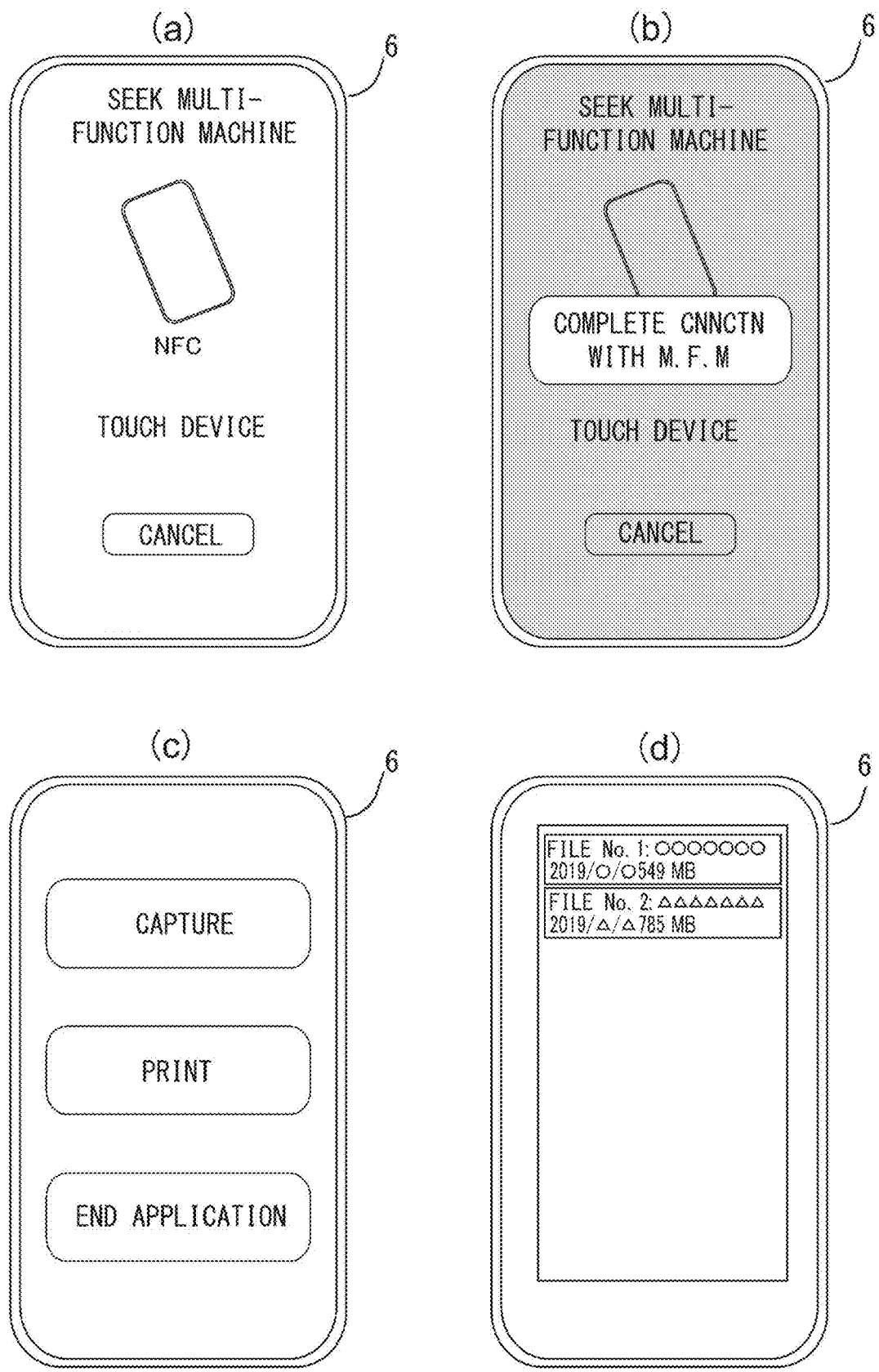

Parts (a) to (d) of FIG. 19 are schematic views each showing a display screen of the portable terminal, in which part (a) shows an initial screen, part (b) shows a WiFi connection notification screen, part (c) shows a job selection screen, and part (d) shows a data selection screen.

DESCRIPTION OF THE EMBODIMENTS

An image forming apparatus of an embodiment of the present invention will be described. First, a general structure of an image forming apparatus 1 of this embodiment will be described using FIGS. 1 to 4. The image forming apparatus 1 is, for example, a general multi-function machine possessing various functions such as a copy function, a scan function and a print function.

The image forming apparatus 1 of this embodiment enables authentication of a user by carrying out NFC between a portable terminal (portable communication terminal) 6 and the image forming apparatus 1. Then, the image forming apparatus 1 authenticates the user, so that the user is capable of using the image forming apparatus 1. Further, the image forming apparatus 1 of this embodiment enables wireless LAN connection between the portable terminal 6 and the image forming apparatus 1 by NFC. By this, for example, transmission and reception of data, large in data volume, such as image data (information on image formation) in the portable terminal 6 is carried on by the wireless LAN such as WiFi (registered trademark), and an image based on this image data can be outputted by the image forming apparatus 1. Or, the data is not limited to the image data, but may also be setting data (information on image formation) such as a kind or a size of a recording material S.

Figure 1:
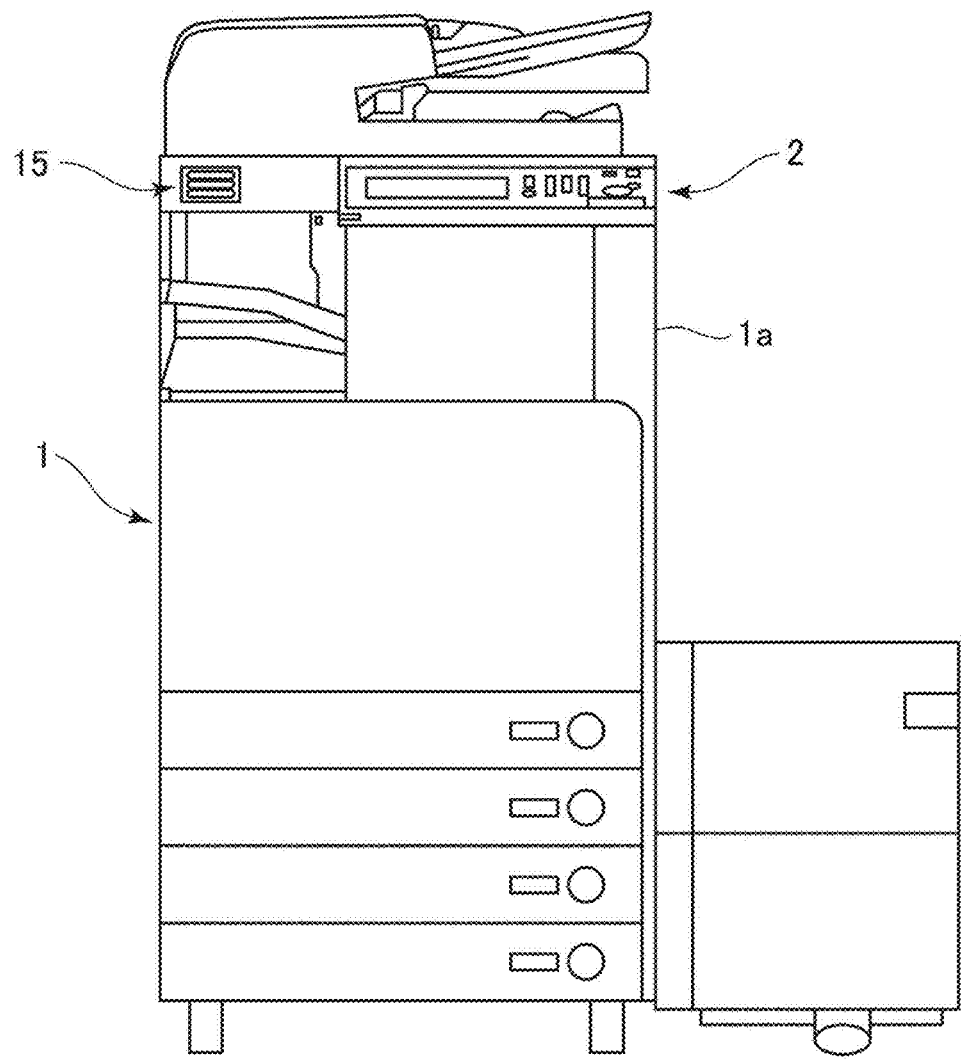
FIG. 1 is a front view of an image forming apparatus according to this embodiment.
Figure 2:
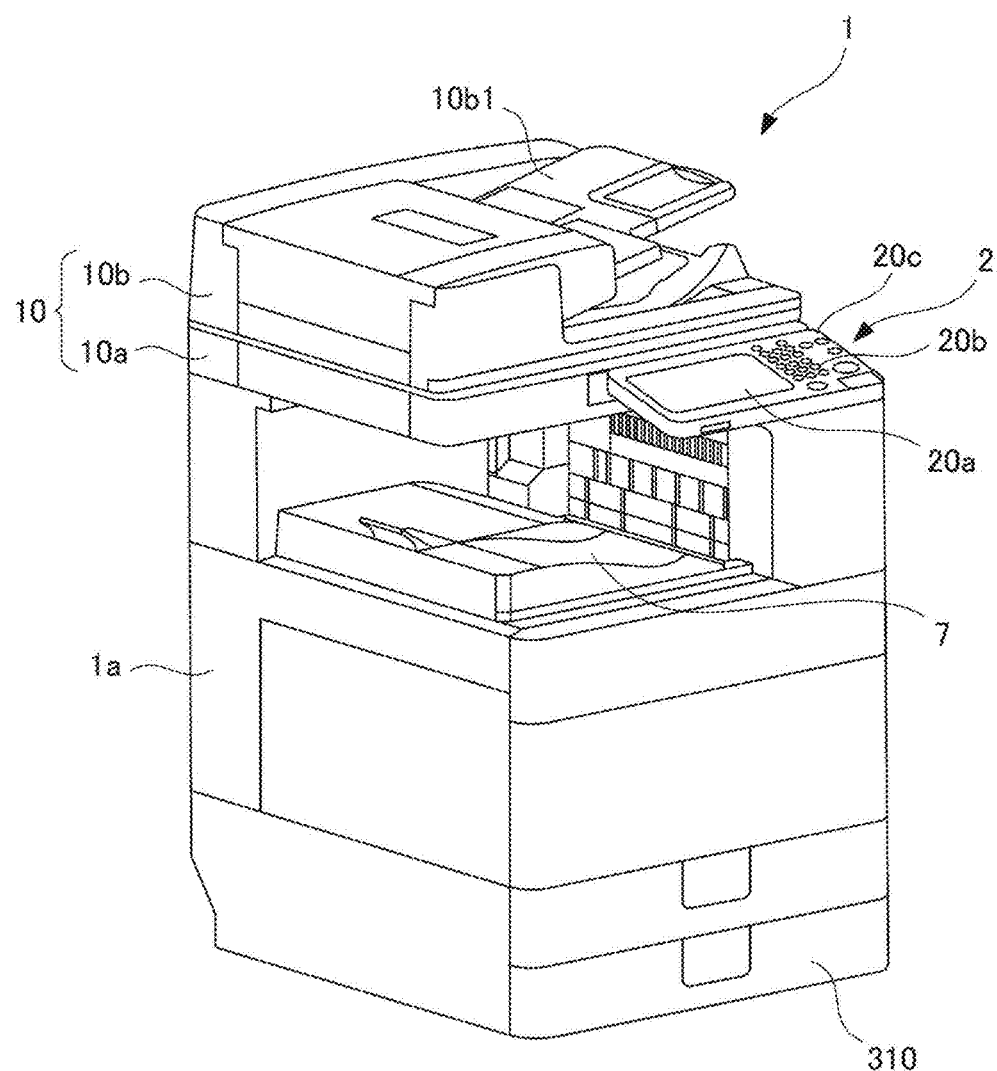
FIG. 2 is a perspective view of the image forming apparatus.

As shown in FIGS. 1 and 2, the image forming apparatus 1 includes an apparatus main assembly 1a incorporating therein an image forming unit 11 (FIG. 3) as an image forming portion for forming an image on the recording material S, an operating panel (operating unit) 2 provided on a front sound of the apparatus main assembly 1a, and a human sensor 15 and the like. As the recording material S, it is possible to cite a sheet such as paper, a plastic film, a cloth or the like. To the operating panel 2, an operation instruction by the user such as an operator is inputted.

Figure 3:
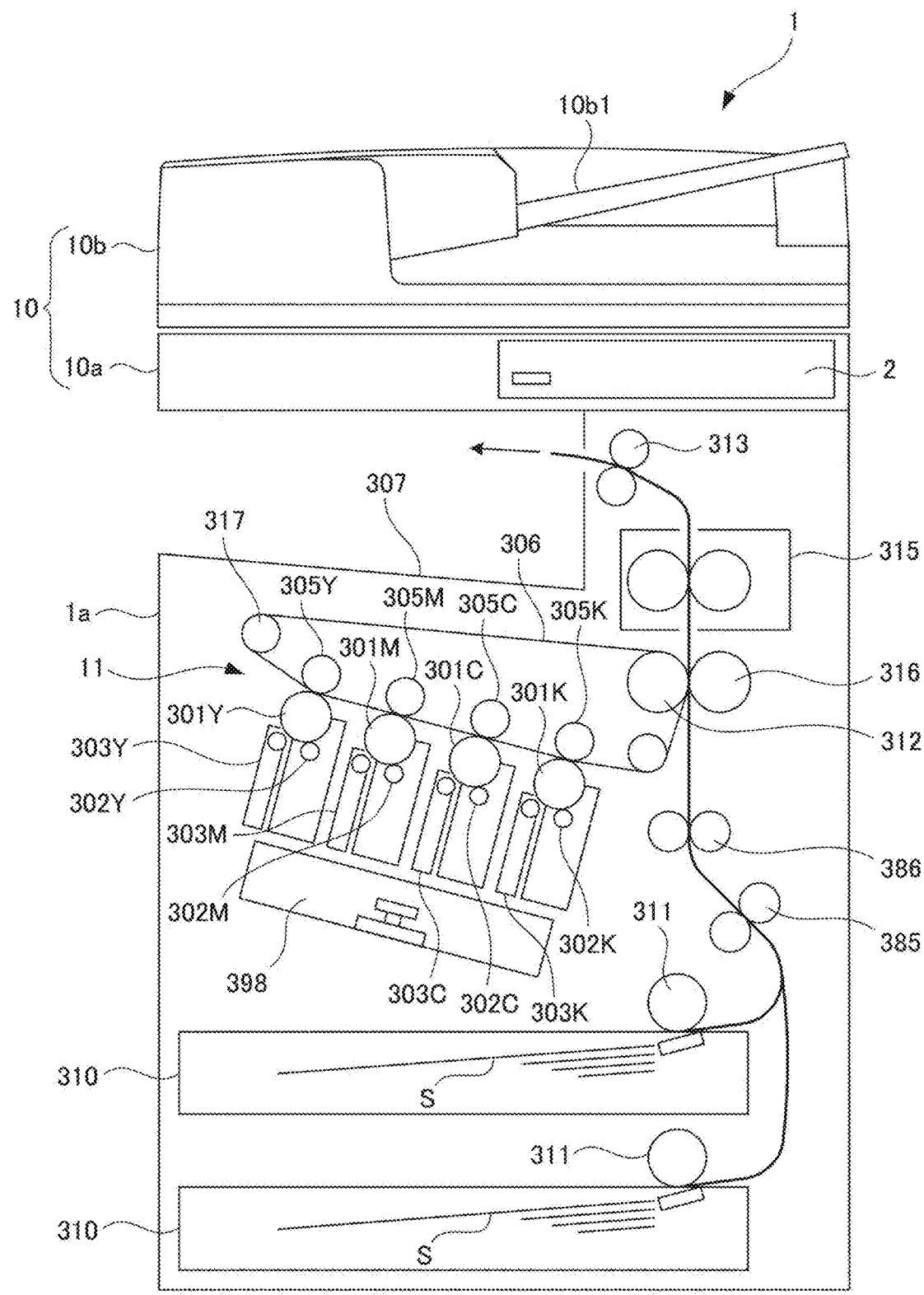
FIG. 3 is a schematic sectional view of the image forming apparatus.

The image forming apparatus 1 of this embodiment is, as shown in FIG. 3, an image forming apparatus of an intermediary tandem type in which an image is formed by transferring toner images of four colors of yellow (Y), magenta (M), cyan (C) and black (K) onto an intermediary transfer belt and then by transferring the toner images onto the recording material S. Incidentally, in the following description, to members using touches of the respective colors, suffixes Y, M, C and K are added. However, constitutions and operations of the respective members are substantially the same except that the colors of toners used are different from each other, and therefore, as regards the same constitution, a constitution for forming a yellow toner image is described as a representative, and constitutions of other colors will be omitted from description.

FIG. 2 is a schematic perspective view of the image forming apparatus 1. FIG. 3 is a schematic sectional view of the image forming apparatus 1. The image forming apparatus 1 includes, as shown in FIG. 3, the image forming unit 11 for forming the image on the recording material S. The image forming unit 11 includes photosensitive drums 301Y, 301M, 301C and 301K, charging rollers 302Y, 302M, 302C and 302K, and developing devices 303Y, 303M, 303C and 303K. Further, the image forming unit 11 includes primary transfer rollers 305Y, 305M, 305C and 305K, a laser scanner unit 398, an intermediary transfer belt 306, a secondary transfer roller 316, a secondary transfer opposite roller 312, and the like.

The image forming apparatus 1 further includes, as shown in FIG. 2, an image reading unit 10 for reading an image of an original. The image reading unit 10 is constituted by a reader 10a and an ADF 10b. The reads 10a optically reads the image of the original placed on an unshown placement table formed with a glass plate and converts the image into image data. The ADF 10b automatically feeds original stacked on an original tray 10bi and reads the image. The ADF 10b is rotatably supported and is opened upward by being rotated whereby the user has access to the placement table of the reader 10a.

Further, on a front (surface) side of the image forming apparatus 1, an operating panel 2 which is an operating unit capable of making setting on image formation and setting on image reading is provided. In the case of this embodiment, the operating panel 2 is provided on the front side than the image reading unit 10. For that reason, the user can easily operate the operating panel 2. The operating panel 2 includes an operation display portion 20a capable of not only displaying information but also inputting information and providing an instruction to the image forming apparatus through touch operation, keys 20b for inputting numerical values and the like, and an outer casing cover 20c. The operation display portion 20a is capable of inputting information and providing the instruction to the image forming apparatus by displaying and touching software keys (touch operation) as described specifically later. The keys 20b as a manual input portion are hardware keys (physical keys) capable of inputting the information and providing the instruction to the image forming apparatus by displaying and touching the software keys. Incidentally, the keys 20b may also be omitted.

The user is capable of inputting the information such as the numerical values and providing the instruction to the image forming apparatus by operating the operation display portion 20a or the keys 20b. Further, it is possible to make setting an image formation such as setting of a size of the recording material S for image formation and the number of sheets subjected to image formation, and setting on reading of the image such as setting of an original size.

Figure 4:
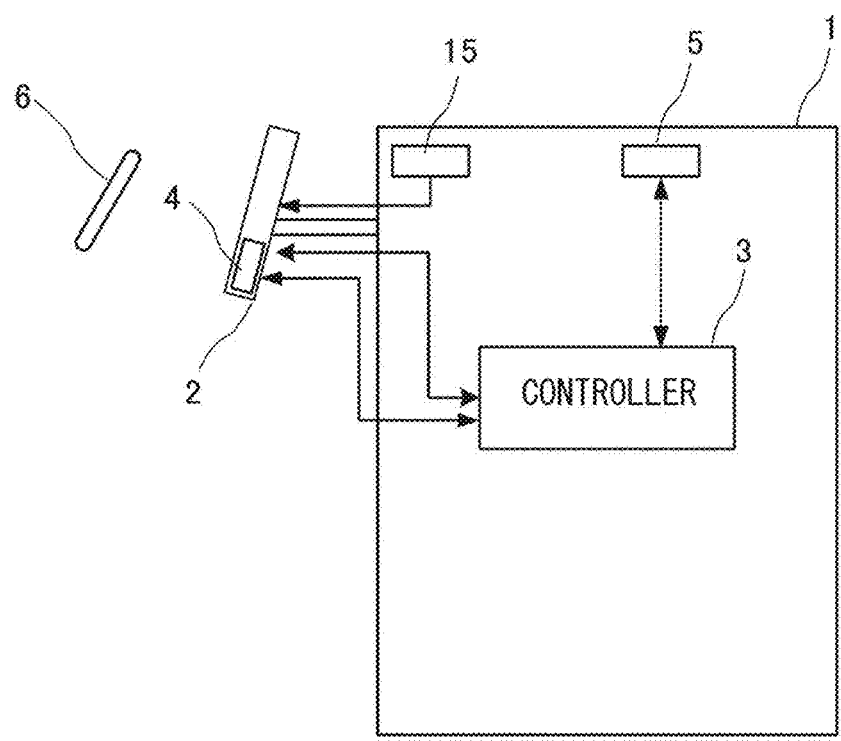
FIG. 4 is a block diagram showing a constitution of a principal part of the image forming apparatus.

Next, an image forming operation by the image forming apparatus 1 will be described. When the image is formed, first, an image forming job signal is inputted to a controller 3 (FIG. 4). By this, a feeding roller 311 and a conveying roller 385 are rotated as shown in FIG. 3, and the recording material S stacked and accommodated in a cassette 310 is fed to a registration roller pair 386. Then, the recording material S is sent at predetermined timing by the registration roller pair 386 to a secondary transfer portion formed by the secondary transfer roller 316 and the intermediary transfer belt 306 stretched by the secondary transfer opposite roller 312.

On the other hand, in the image forming unit 11, first, the sound of the photosensitive drum 301Y is electrically charged by the charging roller 302Y. Thereafter, in accordance with an image signal of an image of the original read by the image forming unit 10 or an image signal or the like sent from an external device such as a personal computer, the laser scanner unit 398 irradiates the sound of the photosensitive drum 301Y with laser light. By this, an electrostatic latent image is formed on the sound of the photosensitive drum 301Y. Thereafter, toner of yellow is deposited on the electrostatic latent image formed on the sound of the photosensitive drum 301Y by the developing device 303Y, so that a yellow toner image is formed on the sound of the photosensitive drum 301Y. The toner image formed on the sound of the photosensitive drum 301Y is primary-transferred onto the intermediary transfer belt 306 under application of a primary transfer bias to the primary transfer roller 305Y.

By a similar process, toner images of magenta, cyan and black are also formed on the photosensitive drums 301M, 301C and 301K, respectively. Then, by applying the primary transfer bias to the primary transfer rollers 305M, 305C and 305K, these toner images are superposedly transferred onto the yellow toner image on the intermediary transfer belt 306. By this, a full-color toner image depending on the image signal is formed on the sound of the intermediary transfer belt 306.

Thereafter, the intermediary transfer belt 306 is moved and circulated by transmission of a driving force from a driving roller 317 thereto, so that the full-color toner image is sent to the secondary transfer portion. Then, at the secondary transfer portion, by applying a secondary transfer bias to the secondary transfer roller 316, the full-color toner image on the intermediary transfer belt 306 is transferred onto the recording material S.

Then, the recording material S on which the toner image is transferred is subjected to heating and pressing processes in a fixing device 315, whereby the toner image on the recording material S is fixed on the recording material S. Thereafter, the recording material S on which the toner image is fixed is discharged to a discharging portion 307 by a discharging roller pair 313.

As shown in FIG. 4, in the operating panel 2, a portable terminal (external device) 6 possessed by the user and an NFC tag portion 4 for carrying out the NFC as near field wireless communication are provided. In other words, the NFC tag portion 4 is incorporated in the operating panel 2. The NFC tag portion 4 is, as specifically described later, constituted by an antenna for carrying out transmission and reception of radio wave and an IC chip for controlling the NFC, and carries out the NFC, which is the near field wireless communication, between itself and the portable terminal such as a smartphone possessed by the user. The NFC (near field communication) in a non-communication wireless communication standard utilizing electromagnetic radiation of 13.56 MHz.

Further, the image forming apparatus 1 is provided with a human sensor 15 for detecting the user who approaches the image forming apparatus 1. The human sensor 15 is, for example, disposed at the front surface of the apparatus main assembly 1a, and in the case where a human (person) exists in front of the image forming apparatus 1, the human sensor 15 detects the human. Incidentally, the human sensor 15 may also be provided in the operating panel 2. For example, inside a slit formed in an outer casing cover 20c of the operating panel 2, the human sensor 15 is disposed, and ultrasonic wave is sent through the slit, so that reflected wave thereof is received and thus the user may also be detected.

Further, the image forming apparatus 1 is provided with a wireless LAN communication portion 5 for carrying out wireless LAN communication with the portable terminal 6. The LAN is an abbreviation of "Local Area Network". The NFC tag portion 4 and the wireless LAN communication portion 5 are connected to a controller 3 for controlling an operation of the image forming apparatus 1 through interfaces, respectively.

The portable terminal 6 is a device of a portable type, such as a smartphone or a computer of a tablet type, and has functions of the NFC and the wireless LAN communication. The user carries out wireless communication with the image forming apparatus 1 by using the portable terminal 6 and causes the image forming apparatus 1 to execute various processes.

[Controller]

Figure 5:
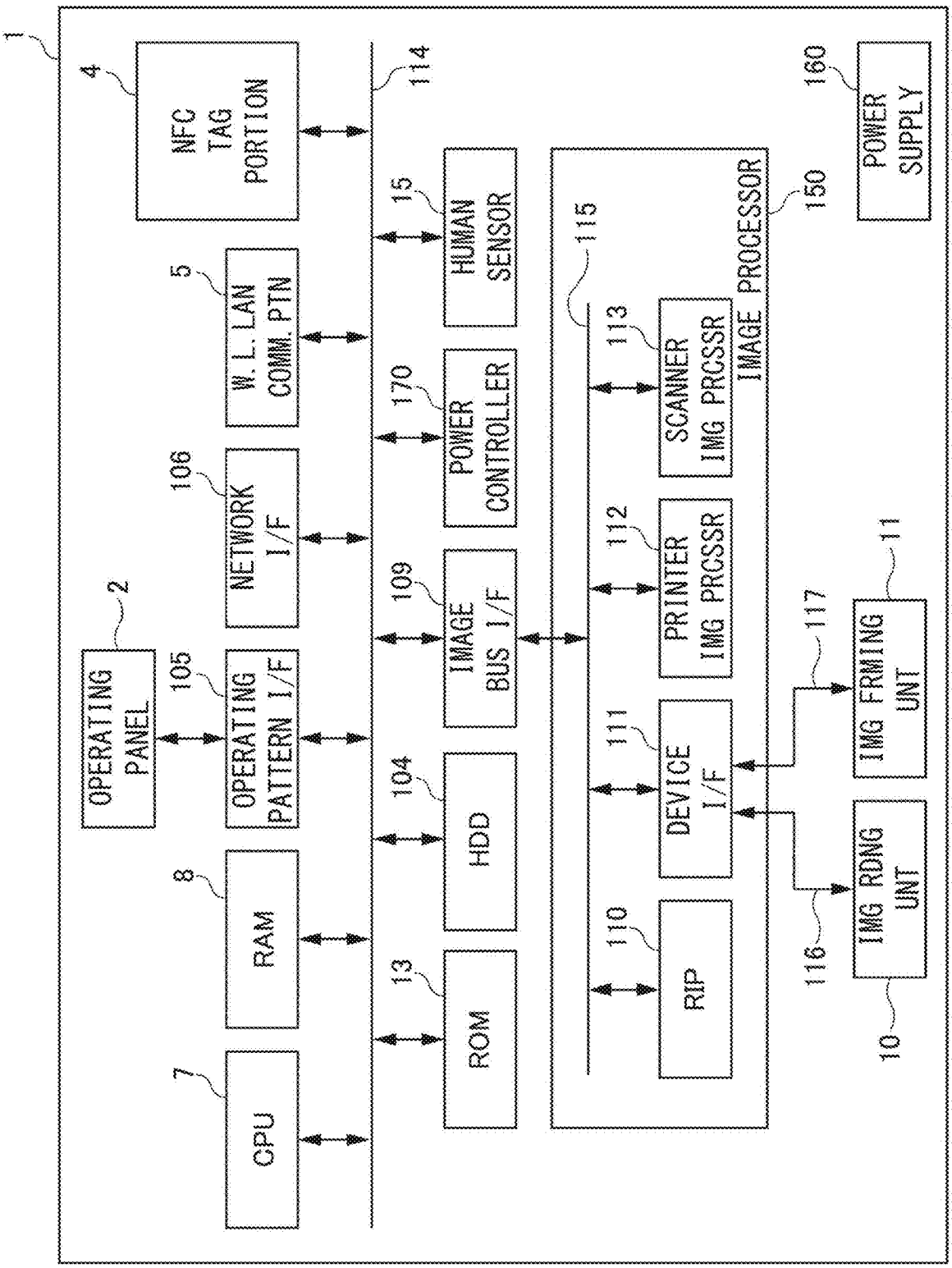
FIG. 5 is a control black diagram of the image forming apparatus.

Next, a system constitution of the image forming apparatus 1 will be described using FIG. 5. As shown in FIG. 5, the image forming apparatus 1 is provided with a RAM (memory) 8 in which data used for computation (calculation) by the CPU 7 is temporarily stored and with a ROM (storing device) 13 in which various programs are stored. Further, the image forming apparatus 1 is provided with an HDD 104 in which pieces of software and various settings relating to pieces of control of the image forming apparatus 1 and preserved documents are stored.

Further, the image forming apparatus 1 is provided with a network interface 106 for carrying out transmission and reception of data relative to an external device through the LAN and with the wireless LAN communication portion (wireless LAN interface) 5 for carrying out transmission and reception of data relative to the external device through the wireless LAN communication. Further, the image forming apparatus 1 is provided with an operating panel interface 105 for relaying input data through the operating panel 2 and image data to be displayed on the operating panel 2.

Further, the image forming apparatus 1 includes a power source (electric power) controller 170 for switching between supply of electric power to a particular device and stop of the supply by receiving an instruction from the CPU 7. The electric power controller 170 controls a power supply device 160 which receives supply of power source from a commercial power source and which is capable of supplying electric power by converting the power source into the electric power used in the respective devices. The electric power controller 170 controls the supply and stop of the supply of the electric power to each of the operating panel 2, the network interface 106, the wireless LAN communication portion 5, the image processing portion 150, the image reading unit 10, the image forming unit 11 and the human sensor 15. The above-described devices, NFC tag data 4 and human sensor 15 are connected to each other through a system bus 114.

Further, the image forming apparatus 1 includes the image processing portion 150 for processing the image. The image processing portion 150 is constituted by a RIP 110, a device interface 111, a printer image processing portion 112 and a scanner image processing portion 113, and these portions (elements) are connected to each other through an image bus 115. Further, the image bus 115 and the system bus 114 are constituted to each other through an image bus interface 109, and by the image bus interface 109, relay and data structure conversion between the image bus 115 and the system bus 114 are carried out.

The RIP 110 is a raster image processor converts a page-description language (PDL) code and a display list into bit mapped image. The scanner image processing portion 113 subjects image data read by the image reading unit 10 to image processing such as correction, resolution conversion and the like. The printer image processing portion 112 subjects image data formed by the image forming unit 11 to correction, resolution conversion and the like.

The image reading unit 10 is connected to the image bus 115 through a scanner bus 116 and the device interface 111. The image forming unit 11 is connected to the image bus 115 through a print bus 117 and the device interface 111. The device interface 111 adjusts timing when the image data received from the image reading unit is sent to the image bus 115 and timing when the image data is sent from the image bus 115 to the image forming unit 11.

[Hardware Constitution of Image Forming Apparatus]

Figure 6:
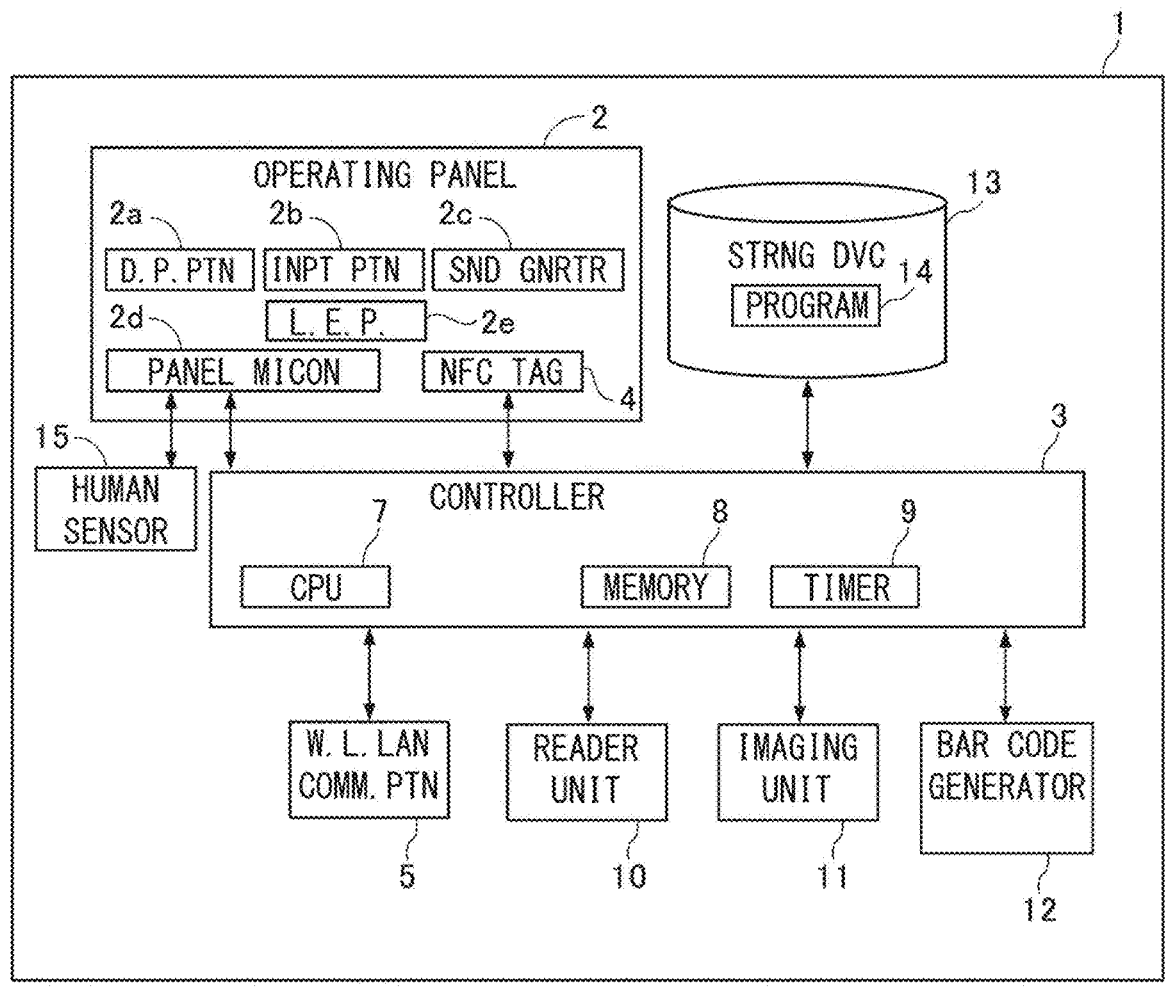
FIG. 6 is a block diagram showing a part of a hardware constitution of the image forming apparatus.

Next, a detailed relationship between the controller 3, the operating panel 2 and the human sensor 15 will be described using FIG. 6. FIG. 6 is a block diagram showing a part of a hardware constitution of the image forming apparatus 1. The image forming apparatus 1 includes the operating panel 2, the image reading unit 10 for reading the original and for generating the image data, the image forming unit 11 for executing an image forming process on the basis of the image data, a two-dimensional bar-code generating portion 12, a storing device (ROM) 13 for storing various pieces of information. Further, the image forming apparatus 1 includes the NFC tag portion 4 as a first communication portion, provided in the operating panel 2, for performing the above-described NFC and includes the wireless LAN communication portion 5 as a second communication portion. These portions are connected to each other through interfaces.

The controller 3 includes the CPU 7, a memory (RAM) 8 and a timer 9, and controls operations of the respective portions. The CPU 7 reads a program 14 stored in the storing device 13 and executes the program 14. The program 14 is a program causing the controller 3 to function for performing various processes described later. The memory 8 is used for storing temporary data with execution of the program by the CPU 7. The timer 9 is used for timing when the controller 3 performs the various processes. Further, the controller 3 also functions as an authenticating portion for authenticating the user on the basis of the NFC as described later.

The operating panel 2 includes the operating panel display portion 20a (FIG. 2) for permitting the user to perform the operation as described above, the keys 20b (FIG. 2), an operation sound generating portion (sound generating portion) 2c, an operating panel micon 2d, a light emitting portion 2e, and the NFC tag portion 4. The operating panel display portion 20a includes a display portion 2a and an operation input portion 2b as an operating portion. The display portion 2a is constituted by, for example, a liquid crystal panel and is capable of displaying various pieces of information. The display portion 2a is capable of displaying an image on the liquid crystal panel, for example, by receiving the image data from the controller 3 through an unshown transfer line for image data. Further, the display portion 2a is capable of displaying pieces of information on image formation, such as a print number of sheets, a size of a print sheet, a type of color/monochromatic printing, which are various conditions when the image is printed on the recording material S (for example, the sheet).

The operation input portion 2b is a touch panel or the like provided on the display portion 2a, and the user is capable of inputting information by a touch operation. In this embodiment, the operation input portion 2b is a touch panel such that software keys are displayed at the display portion 2a and the user is capable of inputting the information by the toner operation of the software keys. The operation sound generating portion 2c as the sound generating portion is used for generating various operation sounds with user operations and a notification sound for notifying the user of a communication status. The light emitting portion 2e is, for example, an LED (Light Emitting Diode) for displaying a state of the image forming apparatus by blinking or lighting of light or for notifying the user of the communication status. The operating panel micon 2e control these portions and communicates with the controller 3.

The operating panel 2 in this embodiment has a constitution including both the operation sound generating portion 2c and the light emitting portion e2, but of these portions, the operating panel 2 may also have a constitution including only the operation sound generating portion 2c or a constitution including only the light emitting portion 2e.

The NFC tag portion 4 performs the NFC with the external device (the portable terminal 6 in this embodiment) on the basis of the NFC standard (first communication type), and thus carries out data input and output between the portable terminal 6 and the controller 3. The NFC tag portion 4 in this embodiment is constituted by an IC for RFID (Radio Frequency Identification) and operates as an NFC tag.

The human sensor 15 is capable of detecting the presence of a human (person) within a predetermined region of a periphery of the image forming apparatus 1. The human sensor 15 in this embodiment in a sensor for detecting the human or an object present in front of the image forming apparatus 1, and then sends a detection signal to the operating panel micon 2d. For example, when the human sensor 15 detects the human in the case where the image forming apparatus 1 is in a sleep mode, the controller 3 causes the operating panel 2 to display a touch screen over which the portable terminal 6 is to be held at a predetermined position of the image forming apparatus 1 (FIG. 13). Further, at this time, a state of the image forming apparatus 1 is changed from the sleep mode to a stand-by state.

The wireless LAN communication portion 5 performs processing of the wireless LAN communication with the external device (the portable terminal 6 in this embodiment) on the basis of the wireless LAN standard (second communication type), and thus performs data input and output carried out between the portable terminal 6 and the controller 3. Specifically, the wireless LAN communication portion 5 performs processing of transmission and reception of data packets in accordance with a wireless LAN communication procedure. The wireless LAN standard is a standard for wireless communication broader in communication range and faster in communication speed than the NFC standard. Incidentally, the wireless LAN communication portion 5 is compatible with a wireless LAN direct mode such as WiFi Direct.

In the wireless LAN direct mode, the wireless LAN communication portion 5 operates as a wireless LAN access point (software access point), whereby the wireless LAN communication portion 5 is capable of carrying out the wireless LAN communication with the external device such as the portable terminal 6 without through an external wireless LAN access point.

The two-dimensional bar-code generating portion 12 generates (forms) an image of a two-dimensional bar-code by encoding set data into a two-dimensional bar-code (QR code (registered tradename)). The generated image of the two-dimensional bar-code can be read by being displayed at the display portion 2a of the operating panel 2 and then by use of the portable terminal 6 by the user. Incidentally, an image for authentication is an image which is readable by a camera 38 (FIG. 9) of the portable terminal 6 and which contains information for authenticating the user by the image forming apparatus 1. In this embodiment, the image for authentication is the two-dimensional bar-code, but when such an image is used, the image for authentication is not limited to the two-dimensional bar-code. Further, in this embodiment, the two-dimensional bar-code generating portion 12 may also be omitted.

[Hardware Constitution of NFC Tag Portion]

Next, by using FIG. 7, a hardware constitution of the NFC tag portion 4 in the image forming apparatus 1 will be described. The NFC tag portion 4 includes an NFC tag controller 21, a memory 22, an RF controller 23, an RF interface portion 24, an RF field detecting portion 25, a loop antenna 26, and the like.

The NFC tag controller 21 carries out control of the respective portions of the NFC tag portion 4 and thus performs data input and output relative to the controller 3 through interfaces. The NFC tag controller 21 includes a tag reading interruption generating portion 21a.

The tag reading interruption generating portion 21a generating an interruption signal when reading and writing of the NFC tag data relative to the portable terminal 6 by the NFC between itself and the portable terminal 6. The interruption signal of the tag reading interruption generating portion 21a is outputted to the controller 3.

The memory 22 accumulates, as the NFC tag data, data written from the controller 3 or the portable terminal 6, and is constituted by a non-volatile memory. Further, the data written in the memory 22 is capable of being read by the controller 3.

The RF controller 23 performs modulation and demodulation processes of electromagnetic radiation for RF communication when the NFC thereof with the external device (the portable terminal 6 in this embodiment). The RF is an abbreviation of "Radio Frequency".

When the RF interface portion 24 performs the NFC with the external device (the portable terminal 6 in this embodiment), the RF interface portion 24 carries out electromagnetic coupling by being subjected to radiation of electromagnetic radiation, and thus performs transmission and reception processes of the electromagnetic radiation.

The RF field detecting portion 25 detects an electromagnetic field (RF field) in a period in which the RF interface portion 24 is subjected to the radiation of the electromagnetic radiation in the NFC with the external device. Specifically, the RF field detecting portion 25 detects electric power (energy) of the electromagnetic radiation. Incidentally, a detection signal of the RF field detecting portion 25 is outputted to the controller 3.

The loop antenna 26 is an antenna for carrying out the NFC with the external device and is formed in a loop coil shape in order that in this embodiment, communication by the electromagnetic radiation is carried out by subjecting the loop antenna 26 to the radiation of electromagnetic radiation from the portable terminal 6 and by carrying out electromagnetic coupling.

In this embodiment, the NFC tag portion 4 performs electromagnetic coupling by being subjected to the radiation of electromagnetic radiation from the portable terminal 6 and then operates by being supplied with electric power resulting from electromotive force generated by the electromagnetic coupling. Incidentally, the memory 22, the RF controller 23 and the RF interface portion 24 are controlled by the NFC tag controller 21.

[Operating Panel]

Figure 8:
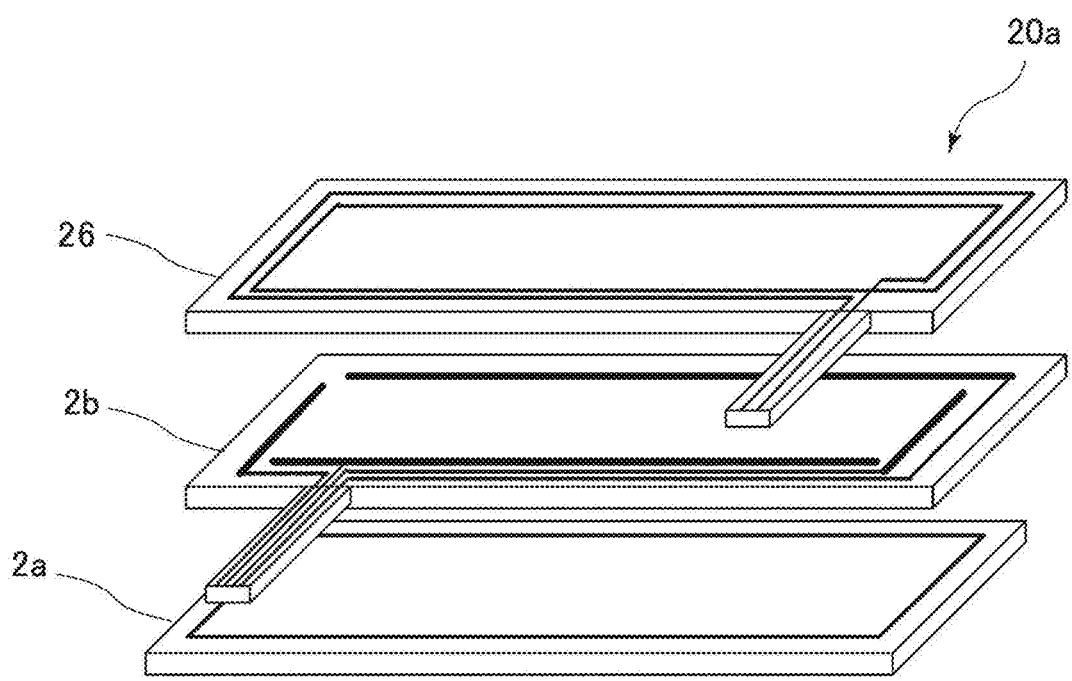
FIG. 8 is a schematic exploded perspective view of a structure of an operating panel.

Next, by using FIG. 8, the operation display portion 20a of the operating panel 2 will be described more specifically. In this embodiment, the operation display portion 20a incorporates (contains) an NFT antenna, and from a lowermost layer, the display portion 2a, the operation input portion 2b which is a touch panel, and the loop antenna 26 which is the NFC antenna are superposedly disposed in a named order. At an outermost portion, as shown protective glass may also be provided.

That is, as the lowermost layer of the operation display portion 20a, the display portion 2a such as a liquid crystal is disposed. The display portion 2a and the operating panel micon 2d (FIG. 6) are connected to each other by an unshown flexible flat cable (hereinafter, referred to as FFC) or the like. On the display portion 2a, the operation input portion 2b such as the touch panel is disposed. Incidentally, in the operating panel 2, "On the display portion 2a" refers to a side where the user touches the operating panel 2.

The operation input portion 2b may also be a touch panel of a resistance type or an electrostatic capacity type or may also be an optical structure, but in this embodiment, a four-wire resistance-type touch panel is used. As regards the touch panel as the operation input portion 2b, electrodes are provided on four sides and each of the electrodes is connected to the operating panel micon 2d through a connector such as a flexible printed circuit (hereinafter, abbreviated as FPC).

On the operation input portion 2b, the loop antenna 26 which is an antenna pattern of the NFC is disposed. The operation input portion 2b and the loop antenna 26 are transparent or semi-transparent films, so that an image displayed on the display portion 2a is visible from above the loop antenna 26.

In this embodiment, the loop antenna 26 is a single antenna pattern, but may also be constituted by a plurality of antenna patterns. The loop antenna 26 is also connected to the RF interface portion 24 through a connector such as the FPC.

The loop antenna 26 is most sensitive when the loop antenna 26 is disposed on the operation input portion 2b in communication with the portable terminal 6. For this reason, in this embodiment, the loop antenna 26 is disposed so as to cover the operation input portion 2b. Incidentally, a position of the loop antenna 26 is not limited thereto, but may also be disposed between the display portion 2a and the operation input portion 2b, for example. Further, the loop antenna 26 and the operation input portion 2b may also be constituted integrally with each other.

In this embodiment, thus, the loop antenna 26 which is the antenna for establishing the NFC is disposed in the operating panel 2 so as to be superposed on the display portion 2a. For this reason, although described specifically later, a touch screen (FIG. 13) such that the user is guided to a predetermined position on the operating panel 2 within a display range so as to hold the portable terminal 6 over the predetermined position can be displayed at the display portion 2a. Then, the user holds the portable terminal 6 over the operating panel 2, so that the user is capable of carrying out the SFC.

[Hardware Constitution of Portable Terminal]

Next, by using FIG. 9, a hardware constitution of the portable terminal 6 will be described. The portable terminal 6 includes a controller 31, an operating panel 34, a storing device 35, an NFC_R/W portion 36, a wireless LAN communication portion 37, a camera 38, a two-dimensional bar-code analyzing portion 39 and the like. The controller 31 controls the portable terminal 6 and is constituted by the CPU 32 and the memory 33. The CPU 32 reads and executes various programs stored in the storing device 35. The memory 33 stores temporary data with execution of the program by the CPU 32.

The operating panel 34 has a constitution in which the user inputs an operation instruction thereto. That is, the operating panel 34 is constituted by a display portion 34a, constituted by a liquid crystal panel, for displaying various pieces of information and an operation input portion 34b which is provided on the display portion 34a and which is a touch panel or the like. In addition, the operating panel 34 includes an operation sound generating portion 34c for generating various operation sounds with various operations. The storing portion 35 stores the above-described various programs and the like.

The NFC_R/W portion 36 performs the NFC with the external device (the image forming apparatus 1 in this embodiment) on the basis of the NFC standard and carries out data input and output performed between the image forming apparatus 1 and the controller 3. The NFC_R/W portion 36 in this embodiment operates as an NFC reader/writer. That is, the NFC_R/W portion 36 reads and writes data through the NFC.

The wireless LAN communication portion 37 performs a communication process with the external device (image forming apparatus 1 in this embodiment) on the basis of the wireless LAN standard, and carries out data input and output performed between the image forming apparatus 1 and the controller 31. The wireless LAN communication portion 37 in this embodiment performs a process of the wireless LAN communication on the basis of the wireless LAN standard, and specifically performs processes of transmission and reception of data packets in accordance with a wireless LAN communication procedure.

The camera 38 is a camera for image pickup. The two-dimensional bar-code 39 analyzes a read two-dimensional bar-code and acquires data of the two-dimensional bar-code. Further, although not illustrated, the portable terminal 6 includes a constitution of electric power supply necessary for the portable terminal 6, such as a battery and a power source (electric power) controller. Incidentally, in this embodiment, the camera 38 and the two-dimensional bar-code analyzing portion 39 may also be omitted.

[Hardware Constitution of NFC_R/W Portion]

Figure 10:
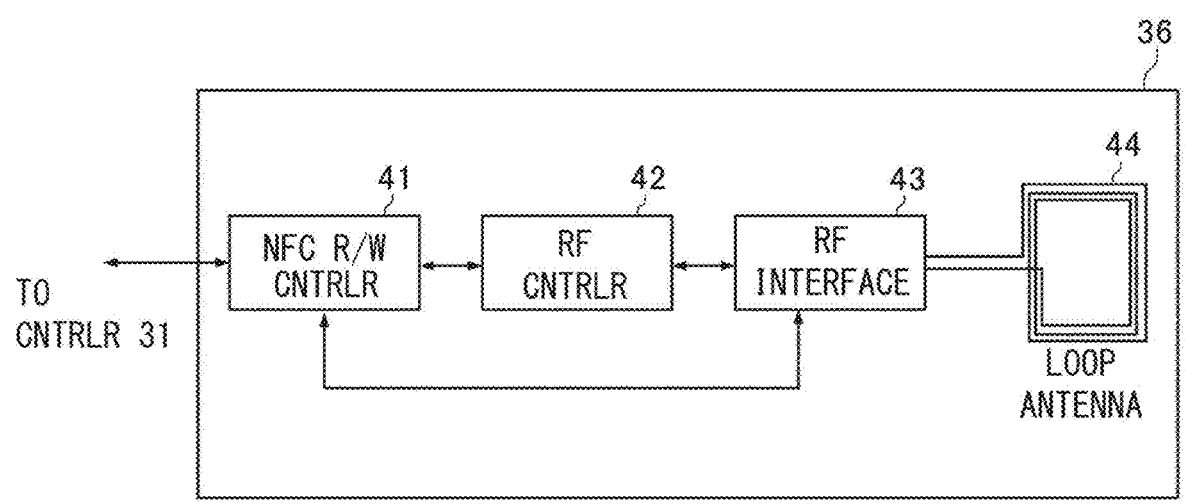
FIG. 10 is a block diagram showing a control constitution of NFC of the portable terminal.

Next, by using FIG. 10, a hardware constitution of the NFC_R/W portion 36 will be described. The NFC_R/W portion 36 includes an NFC_R/W controller 41, an RF controller 42, an RF interface portion 43, a loop antenna 44 and the like.

The NFC_R/W portion 41 controls the respective portions of the NFC_R/W portion 36 and carries out data input and output relative to the controller 31 through the interfaces. The RF controller 42 performs modulation and demodulation of electromagnetic radiation for RF communication when the RF controller 42 performs the NFC with the external device. The RF interface portion 43 radiates the electromagnetic radiation and carries out electromagnetic coupling when performs the NFC with the external device. The RF interface portion 43 radiates electromagnetic radiation (wave) and performs electromagnetic coupling when carries out the NFC with the external device, so that the RF interface portion 43 carries out processes of transmission and reception of the electromagnetic radiation.

The loop antenna 44 is an antenna for performing the NFC with the external device, and in this embodiment, is formed in a loop coil shape for carrying out communication through the electromagnetic radiation by radiating the electromagnetic radiation to the image forming apparatus 1 and by carrying out the electromagnetic coupling. Incidentally, the RF controller 42 and the RF interface portion 43 are controlled by the NFC_R/W controller 41.

[NFC]

Next, by using parts (a) to (d) of FIG. 11 with reference to FIGS. 7, 9 and 10, an operation such that the NFC_R/W portion 36 of the portable terminal 6 carries out electromagnetic coupling with the NFC tag portion 4 of the image forming apparatus 1 and thus reads NFC tag data of the NFC tag portion 4 through the NFC will be described. Incidentally, a detailed communication protocol of the NFC conforms to the NFC standard, and in the following, an operation outline of the NFC by the electromagnetic coupling will be described.

First, as shown in part (a) of FIG. 11, the NFC_R/W portion 36 performs a polling operation for reading the NFC tag data of the NFC tag portion 4. The polling operation is one of communication types of smoothly associating a plurality of devices and a plurality of pieces of software. In response to approach of the portable terminal 6 to the NFC tag portion 4 of the image forming apparatus 1 by the user, the NFC_R/W portion 36 starts the polling operation.

The NFC_R/W controller 41 controls the RF controller 42 and modulates the electromagnetic radiation on the basis of the NFC standard in order to send command data for reading the NFC tag. This modulated wave is sent to the RF interface portion 43. The NFC_R/W controller 41 controls the RF interface portion 43 and sends the modulated wave.

The sent modulated wave is sent to the loop antenna 44 from the RF interface portion 43 and is radiated as the electromagnetic radiation. By this radiated electromagnetic radiation, in the neighborhood of the NFC_R/W portion 36 and the NFC tag portion 4, an RF field (electromagnetic field) is formed, so that the NFC_R/W portion 36 and the NFC tag portion 4 are electromagnetically coupled to each other.

The NFC tag portion 4 receives the electromagnetic radiation by subjecting the loop antenna 26 to radiation of the electromagnetic radiation. The received electromagnetic radiation is sent to the RF interface portion 24, and the RF interface portion 24 generates electromotive force due to the electromagnetic coupling. By this electromotive force, the NFC tag portion 4 obtains electric power and thus operates. At the same time, the electromagnetic radiation received by the RF interface portion 24 is sent to the RF controller 23.

The NFC tag controller 21 controls the RF controller 23 and acquires demodulated data by demodulating the modulated electromagnetic radiation sent to the RF controller 23. The NFC tag controller 21 thus acquires the demodulated data and detects that this demodulated data is command data for reading the NFC tag data.

Therefore, the NFC tag controller 21 reads the data written as the NFC tag data in the memory 22 and transfers, to the RF controller 23, the data as response data to command data. The NFC tag controller 21 controls the RF controller 23 and modulates the ER on the basis of the NFC standard in order to send the response data which is the NFC tag data, so that this modulated wave is sent to the RF interface portion 24.

The NFC tag controller 21 controls the RF interface portion 24 and sends a resultant modulated wave. The sent modulated wave is sent from the RF interface portion 24 to the loop antenna 26, and then is radiated as the electromagnetic radiation. At this point of time, the NFC tag controller 21 regards the NFC tag data as that sending of the NFC tag data as the response data is completed in response to reception of the command data for reading the NFC tag data, and generates an interruption signal by the tap reading interruption generating portion 21a.

On the other hand, in the NFC_R/W controller 41, the loop antenna 44 receives the modulated electromagnetic radiation on the basis of the response data radiated from the NFC tag controller 21. The received electromagnetic radiation is sent to the RF controller 42 through the RF interface portion 43.

The NFC_R/W controller 41 controls the RF controller 42 acquires the demodulated data by demodulating the modulated electromagnetic radiation sent to the RF controller 42. Then, the NFC_R/W controller 41 notifies the controller 31 of that reading of the NFC tag data of the NFC tag portion 4 is completed. At the same time, the NFC_R/W controller 41 transfers the read NFC tag data to the controller 31.

Incidentally, also in the case where the NFC tag portion 4 of the image forming apparatus 1 acquires the data of the NFC_R/W portion 36 of the portable terminal 6, a communication method is similar to the above communication method since a data output side and a data reading side are only reversed.

Part (b) of FIG. 11 is a schematic view showing detection output of the RF field detecting portion 25 of the NFC tag portion 4 when the above-described NFC_R/W portion 36 reads the NFC tag data of the NFC tag portion 4. When the portable terminal 6 is brought close to the image forming apparatus 1, as described above, the NFC_R/W portion 36 radiates the electromagnetic radiation and forms the RF field between itself and the NFC tag portion 4. Then, in a period in which the NFC tag portion 4 receives the electromagnetic radiation, the NFC_R/W portion 36 and the NFC tag portion 4 are electromagnetically coupled to each other and thus is capable of carrying out the NFC. In the NFC tag portion 4, the electromagnetic radiation received by the loop antenna 26 is sent to the RF field detecting portion 25 through the RF interface portion 24. The RF field detecting portion 25 outputs an RF field detection "ON" signal 52 when the RF field detecting portion 25 detects electric power (energy) of the electromagnetic radiation, and outputs an RF field detection "OFF" signal 51 when the RF field detecting portion 25 does not detect the electric power (energy) of the electromagnetic radiation.

In general, in order to read the NFC tag data of the NFC tag portion 4 by the NFC_R/W portion 36 of the portable terminal 6, the portable terminal 6 carries out the NFC by the polling operation such that the electromagnetic radiation is periodically radiated. In that case, in order to reduce electric power consumption, the portable terminal 6 carries out the NFC for reading the NFC tag data by periodically radiating the electromagnetic radiation with a predetermined time interval (referred to as a polling interval), not always radiating the electromagnetic radiation. Further, in the case the user brings the portable terminal 6 close to the image forming apparatus 1 (specifically the NFC tag portion 4), the RF field detecting portion 25 is capable of detecting electric power of the electromagnetic radiation radiated in accordance with the polling interval. Therefore, in a period in which the portable terminal 6 is brought close to the image forming apparatus 1 and the NFC tag portion 4 receives the electromagnetic radiation, the RF field detecting portion 25 generates the RF field detection "ON" signal 52 with the polling interval.

Thereafter, when the user moves the portable terminal 6 away from the image forming apparatus 1 (specifically the NFC tag portion 4), the RF field detecting portion 25 does not detect the electric power of the electromagnetic radiation, and therefore, continuously outputs the RF field detection "OFF" signal 51.

The transfer of output of the RF field detecting portion 25 will be further described. Part (c) of FIG. 11 is a schematic view showing output of the RF field detecting portion 25 in the case where the NFC tag data of the NFC tag portion 4 is normally read by the portable terminal 6. Part (d) of FIG. 11 is a schematic view showing output of the RF field detecting portion 25 in the case where the NFC tag data of the NFC tag portion 4 is not normally read by the portable terminal 6.

As shown in part (c) of FIG. 11, when the portable terminal 6 is brought close to the image forming apparatus 1, the RF field detecting portion 25 of the NFC tag portion 4 outputs the RF field detection "ON" signal 52 with the polling interval. With this, the NFC_R/W portion 36 reads the NFC tag data. Further, when the portable terminal 6 is not brought close to the image forming apparatus 1, the RF field detecting portion 25 of the NFC tag portion 4 outputs the RF field detection "OFF" signal 51. Thus, in a period of time t1 in which the portable terminal 6 is brought close to the image forming apparatus 1, the RF field detecting portion 25 generates the RF field detection "ON" signal 52 with the polling interval, and thereafter when the portable terminal 6 is moved away from the image forming apparatus 1, the RF field detecting portion 25 generates the RF field detection "OFF" signal 51.

When the portable terminal 6 is brought close to the image forming apparatus 1, the RF field detecting portion 25 outputs the RF field detection "ON" signal 52 with the polling interval. Here, the NFC_R/W portion 36 reads the NFC tag data by the polling, but when the NFC fails, the reading of the NFC tag data is not normally completed. In this case as shown in part (d) of FIG. 11, the RF field detecting portion 25 successively outputs the RF field detection "ON" signal 52 with the polling interval.

As described above, the image forming apparatus 1 of this embodiment is capable of carrying out handover such that subsequent data transmission and reception is handed over to the wireless LAN or the like by carrying out the pairing with the portable terminal 6 through the NFC. That is, only by bringing the portable terminal 6 close to the image forming apparatus 1, the user is capable of causing these devices (apparatuses) to automatically make complicated settings for wireless LAN connection. In the image forming apparatus 1, the user possessing the portable terminal 6 is authenticated, so that the wireless LAN connection between the image forming apparatus 1 and the portable terminal 6 is carried out.

Here, pieces of information such as "ID" and "PASSWORD" which are pieces of setting information for carrying out user authentication (individual authentication) are stored in the storing device 35 of the portable terminal 6. As regards reading of the data from the NFC tag portion 4, the NFC_R/W portion 36 of the portable terminal 6 outputs as the NFC tag data, the above-described pieces of information read from the storing device 35. By this, the image forming apparatus 1 is capable of acquiring the setting information necessary for the individual authentication, and authenticates the user possessing the portable terminal 6.

On the other hand, pieces of connection information such as SSID, an encryption key, and IP address, which are pieces of connection information for carrying out an operation in a wireless LAN direct mode are stored in the storing device 13 of the image forming apparatus 1. In the memory 22 of the NFC tag portion 4 of the image forming apparatus 1, the pieces of connection information such as the SSID, the encryption key and the IP address which are read from the storing device 13 are stored. As regards reading of the data from the NFC_R/W portion 36 of the portable terminal 6, the NFC tag portion 4 of the image forming apparatus 1 outputs, as the NFC tag data, the above-described pieces of connection information read from the memory 22. By this, the portable terminal 6 is capable of acquiring the connection information necessary for the wireless LAN connection, so that the image forming apparatus 1 authenticates the user possessing the portable terminal 6 and is capable of carrying out the wireless LAN connection with this portable terminal 6.

As described above, in the case of this embodiment, the user brings the portable terminal 6, compatible with the NFC, close to the NFC tag portion 4 on the image forming apparatus 1 side, whereby the image forming apparatus 1 and the portable terminal 6 acquire the pieces of connection information for the individual authentication and the wireless LAN connection (for example, the WiFi connection). Then, the image forming apparatus 1 automatically makes settings of the individual authentication and the WiFi connection, and ends the NFC after the WiFi connection is established. Thereafter, the image forming apparatus 1 is capable of automatically carrying out data transmission and reception between itself and the portable terminal 6.

Incidentally, conventionally, in the case where the user holds the portable terminal 6 over the image forming apparatus 1, the user has no way to grasp a current communication state from the image forming apparatus 1 about whether the current communication state is a state in which the NFC is carried out or has already been a state capable of data transmission and reception through the WiFi communication. Therefore, as has already been described above, the user has no choice but to keep the portable terminal 6 held over the image forming apparatus 1, and in that period, the user does not readily operate the portable terminal 6. Therefore, in view of this in this embodiment, by notifying the user of that the WiFi connection has been established on the image forming apparatus 1 side, the user was capable of operating the portable terminal 6 while keeping the portable terminal 6 away from the image forming apparatus 1. In the following, a "connection establishment process" in this embodiment for realizing such control will be described.

[Connection Establishment Process]

An operation of the CPU 7 of the controller 3 for notifying the user of establishment of the WiFi communication will be described by using a flowchart of FIG. 12 while making reference to FIGS. 6 and 7. A "connection establishment process" shown in FIG. 12 is executed by the CPU 7 of the image forming apparatus 1 in response to a start of the NFC communication between the portable terminal 6 and the image forming apparatus 1 carried out by bringing the portable terminal 6 close to the image forming apparatus 1 by the user.

Before the "connection establishment process" is described, in order to carry out the NFC between the portable terminal 6 and the image forming apparatus 1, a "touch screen" showing a position where the user holds the portable terminal 6 over the image forming apparatus 1 will be described. FIG. 13 shows the "touch screen". The "touch screen" shown in FIG. 13 displays a target mark showing a position over which the user holds the portable terminal 6. In this embodiment, the loop antenna 26 of the NFC tag portion 4 for carrying out the NFC with the portable terminal 6 is disposed in the operating panel 2, and therefore, the target mark is displayed on the operating panel 2. Incidentally, the screen shown in FIG. 13 is an example, and may also be any display if the user can understand the position over which the user holds the portable terminal 6. Further, an "initial screen" displayed in advance on the portable terminal 6 when the user holds the portable terminal 6 over the image forming apparatus 1 will be described later (part (a) of FIG. 19).

The "connection establishment process" (connection mode) will be described. As shown in FIG. 12, when the NFC is started, the CPU 7 sends the connection information necessary for the wireless LAN direct communication, to the portable terminal 6 (S1). After the connection information is sent, the CPU 1 discriminates whether or not the wireless LAN connection between the image forming apparatus 1 and the portable terminal 6 is established (S2). In the case where the wireless LAN communication between the image forming apparatus 1 and the portable terminal 6 is established (Yes of S2), the CPU 7 notifies the user of that the wireless LAN connection was established in the image forming apparatus 1 (S3). As a method of notifying the user of that the wireless LAN connection was established in the image forming apparatus 1, for example, as shown in FIG. 14, a notification sound may be generated from the operation sound generating portion 2c (for example, a speaker or the like) provided in the operating panel 2. Further, as shown in FIG. 15, a light emission state of the light emitting portion 2e (for example, an LED or the like) may also be changed by causing the light emitting portion 2e to light or blink.

As shown in part (a) of FIG. 16, a display state of the display portion 2a may also be changed by displaying, on the display portion 2a of the operating panel 2, a message that "CONNECTION WITH PORTABLE TERMINAL ESTABLISHED" or the like message. By doing so, the user can understand that the wireless LAN connection between the image forming apparatus 1 and the portable terminal 6 was established. Incidentally, at this time, the CPU 7 may cause the portable terminal 6 to display a message to the effect that the wireless LAN connection was established ("WiFi connection notification screen" shown in part (b) of FIG. 19 described later). Further, in the case of this embodiment, even after the wireless LAN connection of the portable terminal 6 with the image forming apparatus 1 is established, data transmission and reception through the NFC is capable of being carried out between the image forming apparatus 1 and the portable terminal 6 (FIG. 17 described later). In that case, after the wireless LAN connection between the image forming apparatus 1 and the portable terminal 6 are established and then the portable terminal 6 is notified of that the wireless LAN connection was established, to the portable terminal 6 through the NFC, as shown in part (b) of FIG. 16, a message to the effect that the user may separate (remove) the portable terminal 1 from the image forming apparatus 1 is displayed on the display portion 2a.

Here, in response to the establishment of the wireless LAN connection between the image forming apparatus 1 and the portable terminal 6, the CPU 7 provides an instruction to cause the operation sound generating portion 2c to generate a notification sound for notifying the user of the message to the effect that the wireless LAN connection was established. That is, timing when the wireless LAN connection between the image forming apparatus 1 and the portable terminal 6 was established is timing when the operation sound generating portion 2c generates the notification sound. Specifically, simultaneously with display on the display portion 2a of the message to the effect that the wireless LAN connection was established or within 3 sec from the display, the operation sound generating portion 2c generates the notification sound.

Further, in response to the establishment of the wireless LAN connection between the image forming apparatus 1 and the portable terminal 6, the CPU 7 provides an instruction to cause the light emitting portion 2e to emit light for notifying the user of the message to the effect that the wireless LAN connection was established. That is, timing when the wireless LAN connection between the image forming apparatus 1 and the portable terminal 6 was established is timing when the light emitting portion 2e emits the light. Specifically, simultaneously with display on the display portion 2a of the message to the effect that the wireless LAN connection was established or within 3 sec from the display, the light emitting portion 2e emits the light.

Further, the case where in which in response to the establishment of the wireless LAN connection (communication) between the image forming apparatus 1 and the portable terminal 6, the notification to the user is made by using both the notification sound and the light will be described. In this case, the light emitting portion 2e may generate (emit) the light within 3 sec from generation of the notification sound by the operation sound generating portion 2c, or the operation sound generating portion 2c may generate the notification sound within 3 sec from the generation of the light by the light emitting portion 2e. Further, these may also be performed at the same time. Incidentally, "at the same time" described above does not "at the same time" in a strict sense, but may also have a time lag of, for example, about 0-1 sec.

As timing when the operation sound generating portion 2c stops the generation of the notification sound, for example, there is timing after a lapse of 2 sec from generation of the notification sound by the operation sound generating portion 2c. Thus, the generation of the notification sound is stopped at timing of a lapse of a predetermined time from the generation of the notification sound by the operation sound generating portion 2c. The display portion 2a causes the display to the effect that the wireless LAN communication was enabled to disappear after the operation sound generating portion 2c stops the generation of the notification sound. This is because when the sound disappears and at the same time the display of the display portion 2a also disappears, there is a possibility that the user is confused since the display of the display portion 2a has disappeared although the user who responded to the sound checks the display portion 2a. Accordingly, even after the operation sound generating portion 2c stops the generation of the notification sound, for about 3 sec, the display to the effect that the wireless LAN communication was established (enabled) is continued.

As timing when the light emission or light blinking is stopped, for example, there is timing after a lapse of 2 sec from the light emission by the light emitting portion 2e. Thus, the generation of the notification sound is stopped at timing of a lapse of a predetermined time from the light emission by the light emitting portion 2e. The display portion 2a causes the display to the effect that the wireless LAN communication was enabled to disappear after the light emitting portion 2e stops the light emission. This is because when the light disappears or the light blinking state ends and at the same time the display of the display portion 2a also disappears, there is a possibility that the user is confused since the display of the display portion 2a has disappeared although the user who responded to the light checks the display portion 2a. Accordingly, even after the light emitting portion 2e stops the light emission (light blinking), for about 3 sec, the display to the effect that the wireless LAN communication was established (enabled) is continued.

On the other hand, in the case where the wireless LAN connection with the portable terminal 6 is not established (No of S2), the CPU 7 discriminates whether or not a retry process such that the connection information is resent to the portable terminal 6 is repeated a predetermined number of times (S4). In the case where the retry process is not repeated the predetermined number of times (No of S4), the CPU 7 returns to the PC of the step S and resends the connection information to the portable terminal 6 (retry process). In the case where although the retry process is repeated the predetermined number of times, the wireless LAN connection with the portable terminal 6 is not established (Yes of S4), the CPU 7 notifies the user of connection failure by causing the display portion 2a to display that establishment of the wireless LAN connection through the NFC failed or the like (S5).

Incidentally, in the process shown in FIG. 12, an example in which all the pieces of control are executed by the CPU 7 was described, but sending of the connection information (S1 of FIG. 12) may also be executed by the NFC tag controller 21 in accordance with an instruction of the CPU 17.

A discriminating method by the CPU 7 about whether or not the wireless LAN connection with the portable terminal 6 was established (S2 of FIG. 12) will be described using FIG. 17 while making reference to FIGS. 6, 7, 9 and 10. FIG. 17 is a schematic view showing a communication procedure of the NFC and the WiFi communication between the image forming apparatus 1 and the portable terminal 6 in this embodiment. However, in this embodiment, the case where a polling signal is sent from the portable terminal 6 side to the image forming apparatus 1 side, i.e., the case where the NFC_R/W portion 36 of the portable terminal 6 starts a polling operation will be described as an example.

First, when the portable terminal 6 is brought close to the NFC tag portion 4, the portable terminal 6 (specifically the NFC_R/W portion 36) performs the polling operation for reading the NFC tag data of the NFC tag portion 4 (S1000). The portable terminal 6 performs the polling operation, whereby the portable terminal 6 is connected to the image forming apparatus 1 in a communicatable state without conflicting with another system (for example, a portable terminal other than the portable terminal 6 brought close to the NFC tag portion 4). In the image forming apparatus 1, the NFC tag portion 4 is actuated in response to the polling operation performed by the portable terminal 6. Further, in the portable terminal 6, the NFC_R/W controller 41 controls the RF controller 42 and modulates the electromagnetic radiation on the basis of the NFC standard. This modulated wave is transmitted to the RF interface portion 43 and is radiated as electromagnetic radiation through the loop antenna 44. By this radiated electromagnetic radiation, an RF field is formed in the neighborhood of the NFC_R/W portion 36 and the NFC tag portion 4, so that the NFC_R/W portion 36 and the NFC tag portion 4 are electromagnetically coupled to each other. By this, the NFC is started.

After the NFC is started, in the image forming apparatus 1, the electromagnetic radiation radiated from the portable terminal 6 is received by the loop antenna 26. The received electromagnetic radiation is transmitted to the RF interface portion 24, and the RF interface portion 24 generates electromotive force due to electromagnetic coupling. By this electromotive force, the NFC tag portion 4 obtains electric power and this operates. At the same time, the electromagnetic radiation received by the RF interface portion 24 is transmitted to the RF controller 23.

The NFC tag controller 21 controls the RF controller 23, and acquires demodulated data by demodulating the electromagnetic radiation transmitted to the RF controller 23. The NFC tag controller 21 acquires the demodulated data, and thus is capable of detecting that requirement of reading the NFC tag data is made from the portable terminal 6. When the NFC tag controller 21 detects that the reading requirement of the NFC tag data, the NFC tag controller 21 reads pieces of connection information (SSID, the encryption key and the IP address) written as the NFC tag data in the memory 22 and then transmits the pieces of connection information to the RF controller 23.

The NFC tag controller 21 controls the RF controller 23, and modulates the transmitted pieces of connection information on the basis of the NFC standard. The modulated pieces of connection information are radiated as the electromagnetic radiation (response data) through the RF interface portion 24 and the loop antenna 26 (S1001).

In response to an end of transmission (sending) of the response data, the NFC tag controller 21 generates an interruption signal by the tag reading interruption (signal) generating portion 21a.

Then, in the portable terminal 6, the electromagnetic radiation (response data) radiated from the image forming apparatus 1 is received by the loop antenna 44. The received electromagnetic radiation is transmitted to the RF controller 42 through the RF interface portion 43. The NFC_R/W controller 41 control the RF controller 42, and acquires demodulated data by demodulating the electromagnetic radiation transmitted to the RF controller 42. Thereafter, in the portable terminal 6, by the NFC_R/W controller 41, the controller 31 is notified of reading of the connection information from the image forming apparatus. At the same time, the NFC_R/W controller 41 transfers the read connection information to the controller 31.

When the portable terminal 6 acquires the connection information from the image forming apparatus 1 through the NFC, on the basis of the acquired connection information, the portable terminal 6 sends a "connection requirement (predetermined signal)" of the WiFi communication to the image forming apparatus (S1002). In general, in the wireless communication such as WiFi, a communication network is formed by connecting a WiFi-compatible terminal to an access point functioning as a relay point. In this embodiment, the image forming apparatus 1 controllers to the access point, and the portable terminal 6 controllers to the WiFi-compatible terminal. Here, for example, there are a plurality of image forming apparatuses 1 each functioning as the access point, the portable terminal 6 has to select whether the portable terminal 6 is intended to be connected to either one of the image forming apparatuses 1 (access points). The user is required to cause the portable terminal 1 to discriminate (identify) the image forming apparatus 1 to be connected thereto, and an item functioning as identification mark (sign) at that time is the "SSID". In the case where the portable terminal 6 and the image forming apparatus 1 are not connected to each other through the SFC, the user is required to select the "SSID", corresponding to the image forming apparatus 1 intended to be connected to the portable terminal 6, from a plurality of "SSIDs" displayed on the portable terminal 6 and then to send the "SSID". In this regard, as in this embodiment, in the case where the NFC is established, by the NFC, the "SSID" corresponding to the image forming apparatus 1 intended to be connected to the portable terminal 6 by the user is automatically acquired, so that there is no need that the user manually selects the "SSID".

In the case where the image forming apparatus 1 is identified by the "SSID", then the WiFi connection is established between the portable terminal 6 and the image forming apparatus 1, but for that purpose, an encryption key is needed. The encryption key is used for encrypting communication contents. In the case where the user manually selected the "SSID", the encryption key is also required to input the encryption key. In this embodiment, similar to the "SSID", the encryption key is also contained in the NFC tag data. For that reason, the user touches the NFC tag portion 4 with the portable terminal 6, whereby in addition to the "SSID", the encryption key is also sent from the image forming apparatus 1 to the portable terminal 6.

Further, in this embodiment, information on the IP address of the image forming apparatus is also contained in the NFC tag data. For that reason, the portable terminal 6 acquires the NFC tag data, whereby the portable terminal 6 can know the IP address of the image forming apparatus 1 on the network.

By the above, when authentication (user authentication) of the portable terminal 6 by the image forming apparatus 1 is ended, the image forming apparatus 1 establishes the WiFi communication with the portable terminal 6. Then, when the image forming apparatus 1 establishes the WiFi communication with the portable terminal 6, the image forming apparatus 1 sends, to the portable terminal 6 through the NFC, "connection response" of the WiFi communication to the "connection requirement" (S1002) of the WiFi communication from the portable terminal 6 (S1003). The CPU 3 discriminates that the wireless LAN connection is established when the image forming apparatus 1 sends the "connection response" to the portable terminal 6, and ends the NFC after sending the "connection response". Thus, the WiFi communication is started in a stage in which authentication using the SSID and the encryption key is carried out, but in that state, the NFC is still continued for sending the "connection response" to the portable terminal 6. Then, the CPU 7 ends the NFC at timing when the CPU 7 sends the "connection response" to the portable terminal 6. When the sending of the "connection response" is completed, the CPU 7 causes the display portion 2a to display a message to the effect that the user may move the portable terminal 6 away from the image forming apparatus 1 as described above (part (b) of FIG. 16). Incidentally, in the case of this embodiment, the CPU 7 cannot establish the wireless LAN communication unless after sending the connection information plural times, the CPU 7 receives the "connection response" from the portable terminal 6 within a predetermined time (for example, within 5 sec).

Incidentally, the present invention is not limited to the above-described constitution in which the polling operation from the portable terminal 6 to the image forming apparatus 1 is performed, but may also be a constitution in which the polling operation from the image forming apparatus 1 to the portable terminal 6 is performed. Therefore, the case of the constitution in which the polling operation from the image forming apparatus 1 to the portable terminal 6 is performed will be described using parts (a) to (c) of FIG. 18.

As an electronics module capable of wireless communication with the image forming apparatus 1, in addition to the portable terminal 6, for example, an ID cart can be cited. The portable terminal 6 is a so-called active-type electronics module which radiates electromagnetic radiation by using electric power of a built-in battery when the portable terminal carries out the NFC by the NFC_R/W portion 36. On the other hand, the ID card does not incorporate the battery, and therefore cannot radiate the electromagnetic radiation by itself with use of the electric power. The ID card is a so-called passive-type electronics module in which the electromagnetic radiation is radiated using the received electromagnetic radiation as an energy source when the NFC is carried out. The polling operation is different depending on whether the electronics module is of the above-described active type or passive type.

As has already described above, the polling operation is one of control types for smoothly associating a plurality of devices and pieces of software, and the image forming apparatus is capable of detecting the electronics modules such as the portable terminal 6 and the ID card positioning within a communicatable distance by the polling operation. As shown in part (a) of FIG. 18, an output operation for outputting the polling signal for detecting the electronics module and a monitoring operation for monitoring reception of a response signal from the electronics module relative to the polling signal for a predetermined time are used as a set, and these operations are repeated a predetermined number of times. Accordingly, during the polling operation, the polling signal is outputted with a predetermined output interval. Incidentally, in the following, a period during the polling operation, i.e., a period in which the polling signal is outputted and thus the electronics module is detected is referred to as a "detection period".

In the case where the electronics module enters within the communicatable distance of the NFC tag portion 4 during the detection period, the NFC tag portion 4 of the image forming apparatus 1 receives the response data from the electronics module. Here, receiving timing of the response data received by the NFC tag portion 4 is different between the case where the electronics module entering within the communicatable distance is of the passive type (for example, the ID card) and the case where the electronics module is of the active type (for example, the portable terminal 6). The receiving timing of the response data refers to a period from the output of the polling signal to reception of the response data depending on the polling signal.

For example, when the ID card receives the polling signal, the ID card outputs the response data as reflected wave of the polling signal. In this case, when the ID card enters within the communicatable distance of the NFC tag portion 4, the period from the output of the polling signal to the reception of the response data is as shown in part (b) of FIG. 18. On the other hand, the portable terminal 6 is a device of transmitting the response data by its own electric power, and therefore, different from the passive-type electronics module, there is no need to output the response data immediately after receiving the polling signal. For that reason, as shown in part (c) of FIG. 18, when the portable terminal 6 enters within the communicatable distance of the NFC tag portion 4, the period from the output of the polling signal to the reception of the response data is longer than the period in the case of the ID card. Incidentally, in the case where the NFC tag portion 4 receives the response data from the electronics module during the polling operation, the NFC tag portion 4 interrupts the polling operation and has the CPU 7 take over subsequent respective processes for the NFC.

In response to the reception of the response data from the electronics module, the NFC tag portion 4 sends the SSID and the encryption key to the electronics module. These data are small in capacity, and therefore can be transmitted by the NFC. The electronics module is handover-connected to the WiFi by using the SSID and the encryption key which are received from the NFC tag portion 4. The "connection requirement" of the WiFi communication is made from the electronics module, and thereafter, at timing when the image forming apparatus 1 transmits the "connection response" to the electronics module, the CPU 7 discriminates that the WiFi connection is established, and notifies the electronics module of connection establishment of the WiFi connection.

Figure 9:
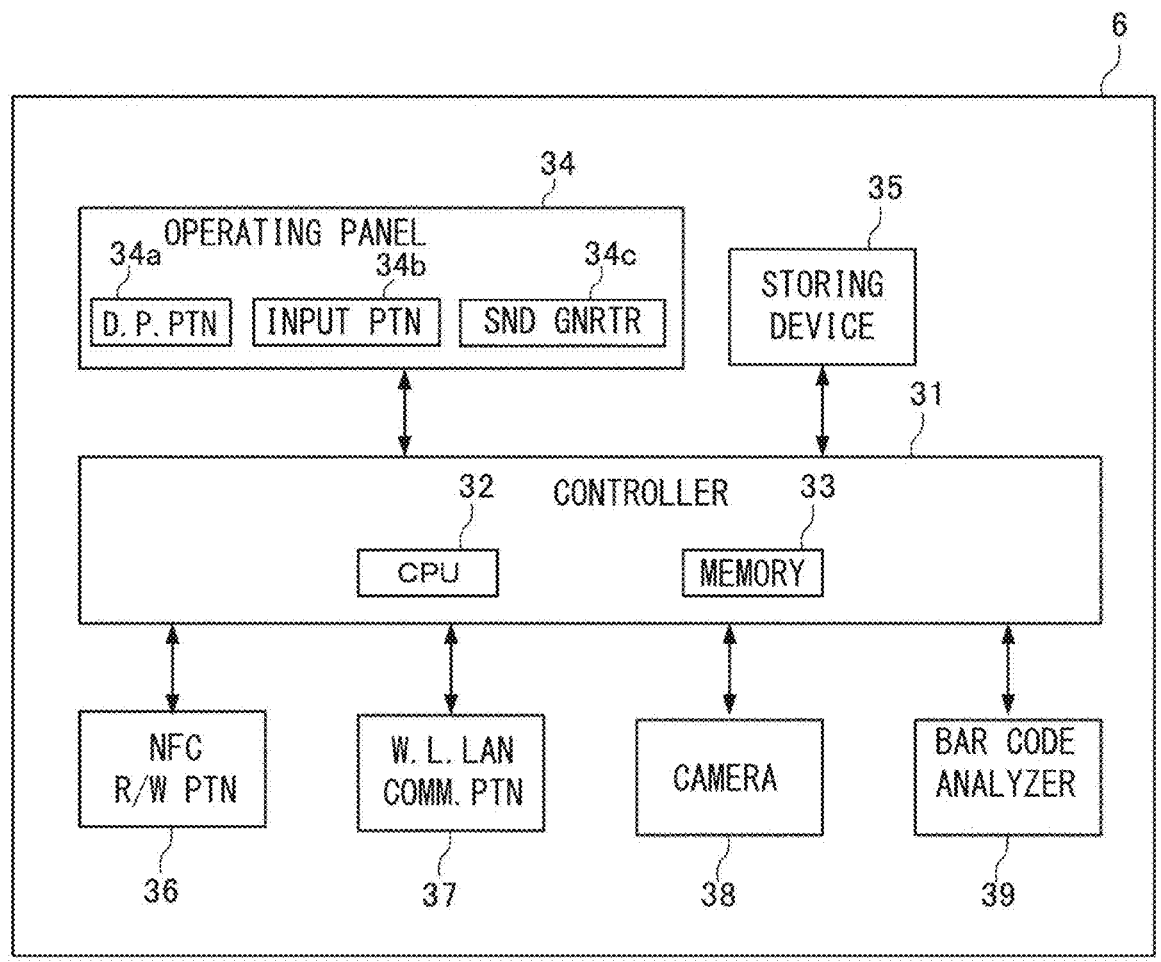
FIG. 9 is a block diagram showing a hardware constitution of a portable terminal in this embodiment.

Here, an example of a user operation using the portable terminal 6 will be briefly described using part (a) to (d) of FIG. 9 while making reference to FIG. 9. Part (a) of FIG. 19 is an initial screen displayed on the portable terminal (specifically, a display portion 34a) in the case where the application program is started in the portable terminal 6 for carrying out the NFC. At this time, the portable terminal 6 radiates the electromagnetic radiation for performing the polling operation. In this embodiment, "CANCEL" button is displayed on the initial screen. In the case where the "CANCEL" button is touched (operated) by the user, the portable terminal 6 stops radiation of the electromagnetic radiation for performing the polling operation, so that the application program is ended. Further, in the case where a display of "SEEK MULTI-FUNCTION MACHINE" of part (a) of FIG. 9 is started, when a predetermined time has elapsed from the start of the display, the application program is automatically ended.

Part (b) of FIG. 19 is a "WiFi connection notification screen" displayed on the display portion 34a in response to the establishment of the WiFi connection between the portable terminal 6 and the image forming apparatus 1. That is, the "WiFi connection notification screen" is temporarily displayed on the display portion 34a in the case where the CPU 32 of the portable terminal 6 receives the "connection response" from the image forming apparatus 1. By display of this screen, the user is capable of confirming, on the portable terminal 6 side, that the WiFi connection between the portable terminal 6 and the image forming apparatus 1 is established. As described above, the image forming apparatus 1 generates the notification sound for notifying the user of establishment of the WiFi connection at the timing of transmitting the "connection response" to the portable terminal 6. Therefore, from the generation of the notification sound from the image forming apparatus 1, the "WiFi connection screen" shown in part (b) of FIG. 19 is displayed. However, this time difference is several ms, and therefore, as a bodily sensation of the user, the timings are substantially the same.

After the display of the "WiFi connection screen" shown in part (b) of FIG. 19, the display of the portable terminal 6 is automatically changed to a "job selection screen" shown in part (c) of FIG. 19. On the "job selection screen" shown in part (c) of FIG. 19, two buttons each capable of selecting either one of jobs of "CAPTURE" and "PRINT" as an example of the jobs and one button for "END APPLICATION" are displayed. Incidentally, the number of kinds of the jobs displayed on the job selection screen and the number of buttons displayed correspondingly thereto are not limited to two. A job other than the "CAPTURE" and the "PRINT" ma also be selectable, and a specification such that another job is selectable in addition to these jobs may also be employed.

Here, a "CAPTURE" job and a "PRINT" job which are capable of being executed by the image forming apparatus 1 by using an application program in this embodiment will be briefly described. The "CAPTURE" job is a function for causing the image forming apparatus 1 to read an original (so-called original scanning) and then for storing image data of the read original in the portable terminal 6. The image forming apparatus 1 uses the image reading unit 10 (FIG. 2) for reading the original. That is, when the "WiFi connection notification screen" is displayed and the user confirms the establishment of the WiFi connection between the portable terminal 6 and the image forming apparatus 1, the user sets, on the image reading unit 10, an original to be desired to be captured in the portable terminal 6. Thereafter, when the user touches (operates) a "CAPTURE" button on the job selection screen shown in part (c) of FIG. 19, reading of the original by the image reading unit 10 is started. Then, when the reading of the original is ended, the image forming apparatus 1 transmits the image data of the read original to the portable terminal 6 through the WiFi communication. The portable terminal 6 causes the memory 33 to store the image data of the original received from the image forming apparatus 1 through the WiFi communication.

The "PRINT" job is a function for printing the image data, stored in the portable terminal 6, in the image forming apparatus 1. When the user touches the "PRINT" button, a screen of the display of the portable terminal 6 is changed to a "data selection screen" shown in part (d) of FIG. 19. The "data selection screen" is a screen on which a list of data of images printable by using the image forming apparatus 1 is displayed. In this "data selection screen", the user is capable of selecting the image data desired to be subjected to printing by the user. In the case where the image data is selected, the selection data is transmitted from the portable terminal 6 to the image forming apparatus 1 through the WiFi communication. The image forming apparatus 1 starts an image forming job in response to reception of the image data from the portable terminal 6, and forms an image on the recording material S on the basis of the received image data. Thus, the user is capable of printing a photograph, a document or the like stored in the memory 33 or the storing device 35 of the portable terminal 6. Compared with the near field wireless communication such as the NFC, the wireless communication such as the WiFi communication is large in communicatable data amount per unit time, and is capable of transmission and reception, in a relatively short time, of the image data such as the photograph or the document, which is large in a data amount. Incidentally, in the case where the "END APPLICATION" button in the "job selection screen" is touched, the started program is ended.

Incidentally, the user operation using the portable terminal 6 after the WiFi communication is not limited to the above-described example. For example, in the case where an application program is started in the portable terminal 6, the "job selection screen" shown in part (c) of FIG. 19 may also be displayed on the portable terminal 6. In this case, for example, it is assumed that for example, the "PRINT" button of the "job selection screen" is touched by the user. Then, it is assumed that the user selects the image data (part (d) of FIG. 19) desired to be subjected to printing by the user and then brings the portable terminal 6 close to the operating panel 2 (FIG. 6) of the image forming apparatus 1. Thus, in response to that the portable terminal 6 is brought close to the operating panel 2, as described above, the NFC and the WiFi communication are carried out, so that the image based on the selected image data is formed on the recording material S. In this case, the user may only be required to select the image data desired to be subjected to the printing and then to bring the portable terminal 6 close to the operating panel 2, so that such an operation is easy.

As described above, in this embodiment, when the user brings the portable terminal 6 close to the image forming apparatus 1, the NFC is established between the portable terminal 6 and the image forming apparatus 1, and then the portable terminal 6 receives, from the image forming apparatus 1, the connection information for the WiFi connection stored in the NFC tag. On the basis of the received connection information, the portable terminal 6 establishes, with the image forming apparatus 1, the WiFi connection broader in communication range and faster in communication speed than the NFC, and thereafter, data transmission and reception between the portable terminal 6 and the image forming apparatus 1 is carried out by the WiFi communication. In the image forming apparatus 1, the NFC is ended after the WiFi communication is established, but at that time, the user is notified of that there is no need for the user to bring the portable terminal 6 close to the image forming apparatus 1. By this, the user is capable of moving the portable terminal 6 away from the image forming apparatus 1 even during the data transmission and reception through the WiFi communication, so that the user is easy to operate the portable terminal 6.

Another Embodiment

Figure 7:
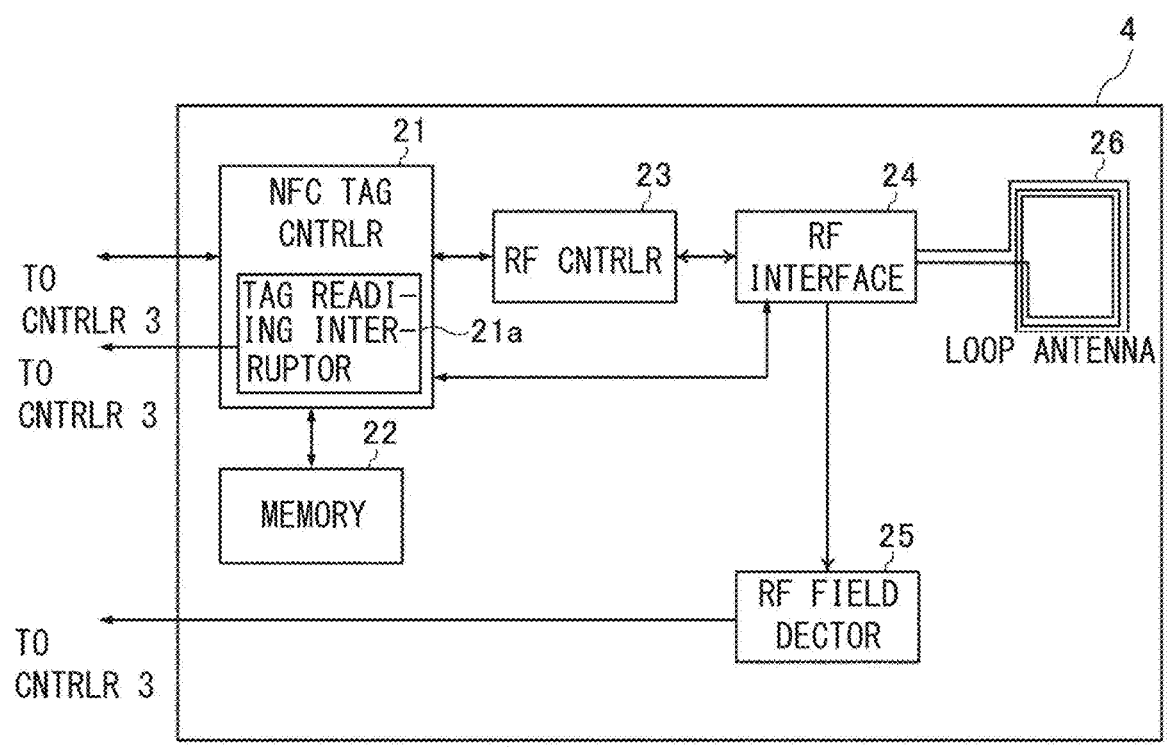
FIG. 7 is a block diagram showing a control constitution of NFC of the image forming apparatus.

In the above-described embodiment, the constitution in which the loop antenna 26 of the NFC tag portion 5 for carrying out the NFC with the portable terminal 6 was disposed in the operating panel 2 was described (FIG. 7). However, the loop antenna 26 may also be disposed outside the operating panel 2. For example, the loop antenna 26 may also be disposed at a position adjacent to the operating panel 2. In this case, as a predetermined position where the user holds the portable terminal 6 over the display portion 2a of the operating panel 2, display indicating a position where the loop antenna 26 is disposed may preferably be made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-203464 filed on Nov. 8, 2019, which is hereby incorporated by reference herein in its entirety.

What is claimed is:

1. An image forming apparatus comprising:
an image forming portion configured to form an image on a sheet;
a first communication portion configured to communicate with a portable terminal through near field wireless communication by using a first communication type in response to holding of the portable terminal thereover;
a second communication portion capable of communicating with the portable terminal on the basis of communication with the portable terminal by using the first communication type and configured to carry out wireless communication with the portable terminal by using a second communication type broader in communication range than the first communication type;
an operating unit configured to receive an operation from a user;
a display portion provided in said operation unit and configured to display that the communication between the portable terminal and said second communication portion is enabled in response to the enablement of the communication between the portable terminal and said second communication portion; and
a sound generating portion configured to generate a notification sound for notifying that communication between the portable terminal and said second communication portion is enabled in response to enablement of the communication between the portable terminal and said second communication portion,
wherein said operating unit includes an antenna configured to carry out near field wireless communication with the portable terminal by the first communication type.

2. An image forming apparatus according to claim 1, wherein said display portion is configured to display that said portable terminal may be separated from a predetermined position where the portable terminal is held over after displaying that the communication between the portable terminal and said second communication portion is enabled.

3. An image forming apparatus according to claim 1, wherein after the notification sound of said sound generating portion stops, said second portion causes display of enablement of the communication between the portable terminal and said second communication portion to disappear.

4. An image forming apparatus comprising:
an image forming portion configured to form an image on a sheet;
a first communication portion configured to communicate with a portable terminal through near field wireless communication in accordance with a first communication type in response to holding of the portable terminal thereover;
a second communication portion capable of communicating with the portable terminal on the basis of communication with the portable terminal by using the first communication type and configured to carry out wireless communication with the portable terminal by using a second communication type broader in communication range than the first communication type; and
a light emitting portion configured to emit light for notifying that communication between the portable terminal and said second communication portion is enabled in response to enablement of the communication between the portable terminal and said second communication portion,
wherein in response to the enablement of communication between the portable terminal and said second communication portion, said light emitting portion notifies that the communication between the portable terminal and said second communication portion is enabled, by changing a light emission state before the enablement of communication between the portable terminal and said second communication portion.

5. An image forming apparatus according to claim 4, wherein said light emitting portion emits the light after the near field wireless communication between the portable terminal and said first communication portion by using the first communication type is disconnected.

6. An image forming apparatus according to claim 4, further comprising:
a display portion configured to display that the communication between the portable terminal and said second communication portion is enabled in response to the enablement of the communication between the portable terminal and said second communication portion; and
an operating unit configured to receive an operation from a user.

7. An image forming apparatus according to claim 6, wherein said operating user includes an antenna configured to carry out near field wireless communication with the portable terminal by the first communication type.

8. An image forming apparatus according to claim 6, wherein said light emitting portion is provided in said operating unit.

9. An image forming apparatus comprising:
an image forming portion configured to form an image on a sheet;
a first communication portion configured to communicate with a portable terminal through near field wireless communication by using a first communication type in response to holding of the portable terminal thereover;
a second communication portion capable of communicating with the portable terminal on the basis of communication with the portable terminal by using the first communication type and configured to carry out wireless communication with the portable terminal by using a second communication type broader in communication range than the first communication type; and
a display portion capable of displaying information on image formation and configured to display that said portable terminal may be separated from a predetermined position where the portable terminal is held over in response to enablement of the communication between the portable terminal and said second communication portion.

10. An image forming apparatus according to claim 9, wherein said display portion is configured to display that communication between the portable terminal and said second communication portion is enabled in response to the enablement of the communication between the portable terminal and said second communication portion.

11. An image forming apparatus according to claim 10, further comprising an operating unit including said display portion and configured to receive an operation from a user,
wherein said operating unit includes an antenna for carrying out the near field wireless communication with the portable terminal by the first communication type, and
wherein the predetermined position is displayed in said display portion.

* * * * *